(12) United States Patent
Fukuzumi

(10) Patent No.: US 6,434,658 B1
(45) Date of Patent: *Aug. 13, 2002

(54) MEMORY DEVICE OPERABLE WITH A SMALL-CAPACITY BUFFER MEMORY AND HAVING A FLASH MEMORY

(75) Inventor: Tomoya Fukuzumi, Hyogo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/395,941

(22) Filed: Sep. 14, 1999

(30) Foreign Application Priority Data

Apr. 5, 1999 (JP) .............................. 11-098019

(51) Int. Cl.$^7$ ................................ G06F 12/00
(52) U.S. Cl. ...................... 711/103; 711/217
(58) Field of Search ................ 711/1, 103, 217

(56) References Cited

U.S. PATENT DOCUMENTS

| | | | | |
|---|---|---|---|---|
| 5,627,783 A | * | 5/1997 | Miyauchi | 365/185.11 |
| 5,724,285 A | * | 3/1998 | Shinohara | 365/185.25 |
| 5,765,002 A | * | 6/1998 | Garner et al. | 713/300 |
| 5,905,993 A | * | 5/1999 | Shinohara | 711/102 |
| 5,963,474 A | * | 10/1999 | Uno et al. | 365/185.04 |

FOREIGN PATENT DOCUMENTS

JP  10-207726  8/1998

* cited by examiner

Primary Examiner—Reginald G. Bragdon
(74) Attorney, Agent, or Firm—McDermott, Will & Emery

(57) ABSTRACT

The 2 lower bits of a medium sector address that the memory device receives from the host system are used as the data corresponding to a column address in a sector in the flash memory. For instance, with the flash memory having the sector capacity of 2048 bytes and the memory device having the sector capacity of 512 bytes, data transfer control portion when the respective 2 lower bits, 00, 01, 10, and 11 are input, starts the data transfer to the flash memory from the buffer memory at a timing corresponding to column addresses 0h, 200h, 400h, and 600h, respectively.

13 Claims, 26 Drawing Sheets

FIG.4

◆MEDIUM SECTOR ADDRESS (2 LOWER BITS)

| MA1 | MA0 | OPERATION |
|-----|-----|-----------|
| 0 | 0 | SET COLUMN ADDRESS OFFSET TO 0h, AND TRANSFER 512 BYTES OF DATA TO/FROM BUFFER MEMORY |
| 0 | 1 | SET COLUMN ADDRESS OFFSET TO 200h, AND TRANSFER 512 BYTES OF DATA TO/FROM BUFFER MEMORY |
| 1 | 0 | SET COLUMN ADDRESS OFFSET TO 400h, AND TRANSFER 512 BYTES OF DATA TO/FROM BUFFER MEMORY |
| 1 | 1 | SET COLUMN ADDRESS OFFSET TO 600h, AND TRANSFER 512 BYTES OF DATA TO/FROM BUFFER MEMORY |

◆MEDIUM SECTOR ADDRESS (2 LOWER BITS)

| MA1 | MA0 | START COLUMN ADDRESS |
|---|---|---|
| 0 | 0 | START COLUMN ADDRESS : 0h |
| 0 | 1 | START COLUMN ADDRESS : 200h |
| 1 | 0 | START COLUMN ADDRESS : 400h |
| 1 | 1 | START COLUMN ADDRESS : 600h |

MEMORY DEVICE OPERABLE WITH A SMALL-CAPACITY BUFFER MEMORY AND HAVING A FLASH MEMORY

BACKGROUND OF THE INVENTION

1. Field of the Invention

The present invention relates to a memory device, and more specifically, to a memory device having a flash memory.

2. Description of the Background Art

In recent years, with the advance of the semiconductor manufacture technology, storage capacities of flash memories have become increasingly larger. With the increase in the storage capacity, the use of a memory device having a flash memory as a storage medium being advantageously small in size and low in power consumption has gradually been accepted particularly in the field of portable equipment.

A flash memory is a non-volatile, rewritable semiconductor memory device that allows the erase operation of data one section at a time. The flash memory integrates storage elements at a high density, and, in order to enable a fast-speed data transmission and reception, specifies a sector address, and reads, erases, and writes (programs) a certain amount of data one sector at a time. In the present specification, the term "program" refers to setting the state of a memory cell in a flash memory to correspond to the value of either 1 or 0 according to data provided from outside. As the capacity of the flash memory increases in size, the sector capacity, the unit of data the flash memory reads out at one time, tends to increase in size as well. For instance, in an AND-type flash memory of 256 Mbits, the sector capacity is 2048 bytes.

On the other hand, the data capacity (hereinafter referred to as a medium sector capacity), which is a unit of data the informational equipment such as a personal computer transmits to and receives from a memory device such as a hard disk or a memory card, is normally 512 bytes, for example, and no such tendency to increase in the medium sector capacity is noted in particular.

In such a memory device having a flash memory with a sector structure, it is necessary to incorporate into the memory device a buffer memory for temporarily storing sector data of a flash memory and for adjusting the timing and the capacity for the data transfer between the memory device and the host system. Normally, an SRAM (Static Random Access Memory) or the like is used as the buffer memory.

The buffer memory was required to be have a capacity of the same or a larger size than the sector capacity of the flash memory even when the capacity of data transfer between the memory device and the host system, i.e. the medium sector capacity, was smaller than the sector capacity of the flash memory.

The sector capacity of the flash memory, however, is on the increase every year so that the incorporation of an SRAM of a large capacity is required, which is a disadvantage with respect to the cost.

SUMMARY OF THE INVENTION

An object of the present invention is to provide a memory device having a flash memory that allows the incorporation of a buffer memory of a small capacity equivalent to the medium sector capacity as well as the reduction in cost.

In summary, the present invention is a memory device with a flash memory and having a write mode in which data is stored upon the reception of an external write address signal and an external write data train from a host system, and including a flash memory and a data input/output portion.

In the flash memory, in the data erase operation, a memory region holding a prescribed number of bits of data is erased at one time as the smallest unit, and in the write mode an internal write data train having a prescribed data length is written according to an internal write address signal.

In the write mode, the data input/output portion receives the external write address signal and generates an internal write address signal, receives and retains the external write data train, and outputs the internal write data train based on the external write data train and the external write address signal.

The data input/output portion includes a first interface portion, a buffer memory, and a second interface portion.

The first interface portion receives the external write data train and the external write address signal from the host system in the write mode.

The buffer memory has a storage capacity corresponding to data elements not smaller in number than data elements contained in the external write data train and smaller in number than data elements contained in the internal write data train. In the write mode, the buffer memory receives the external write data train from the first interface portion.

In the write mode, the second interface portion receives the external write address signal from the first interface portion and generates the internal write address signal, adds to the external write data train read out from the buffer memory dummy data which does not cause data overwrite in the memory region according to the external write address signal to generate the internal write data train.

According to another aspect of the present invention, a memory device having a flash memory is provided which receives an external address signal from a host system and communicates an external data train when storing data, and which includes a data input/output portion and a flash memory.

The data input/output portion generates an internal main address and an internal sub-address corresponding to an external address.

In the flash memory, a memory region holding a prescribed number of bits of data is erased at one time as the smallest unit in the data erase operation, the internal main address selects a memory region as a unit, the internal sub-address specifies a data transmission and reception start location within the memory region, and an internal data train containing a plurality of data elements can be received and transmitted.

The storage capacity of the memory region is larger than the storage capacity corresponding to the number of data elements contained in the external data train.

The data input/output portion adds to a lead address of the memory region a number corresponding to the non-negative integer multiple of the number of data elements contained in the external write data train to produce the internal sub-address.

Thus, the main advantage of the present invention is that, when a flash memory for sector reading is used as a semiconductor device for data storage, the incorporation of a small-capacity buffer memory is advantageous with respect to the cost.

Other advantages of the present invention are that the incorporation of a small-capacity buffer memory is advantageous with respect to the cost, and that data rewrite per medium sector is possible.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing the relation between a column address offset and the two lower bits of a medium sector address.

DESCRIPTION OF THE PREFERRED EMBODIMENTS

Figure 1:
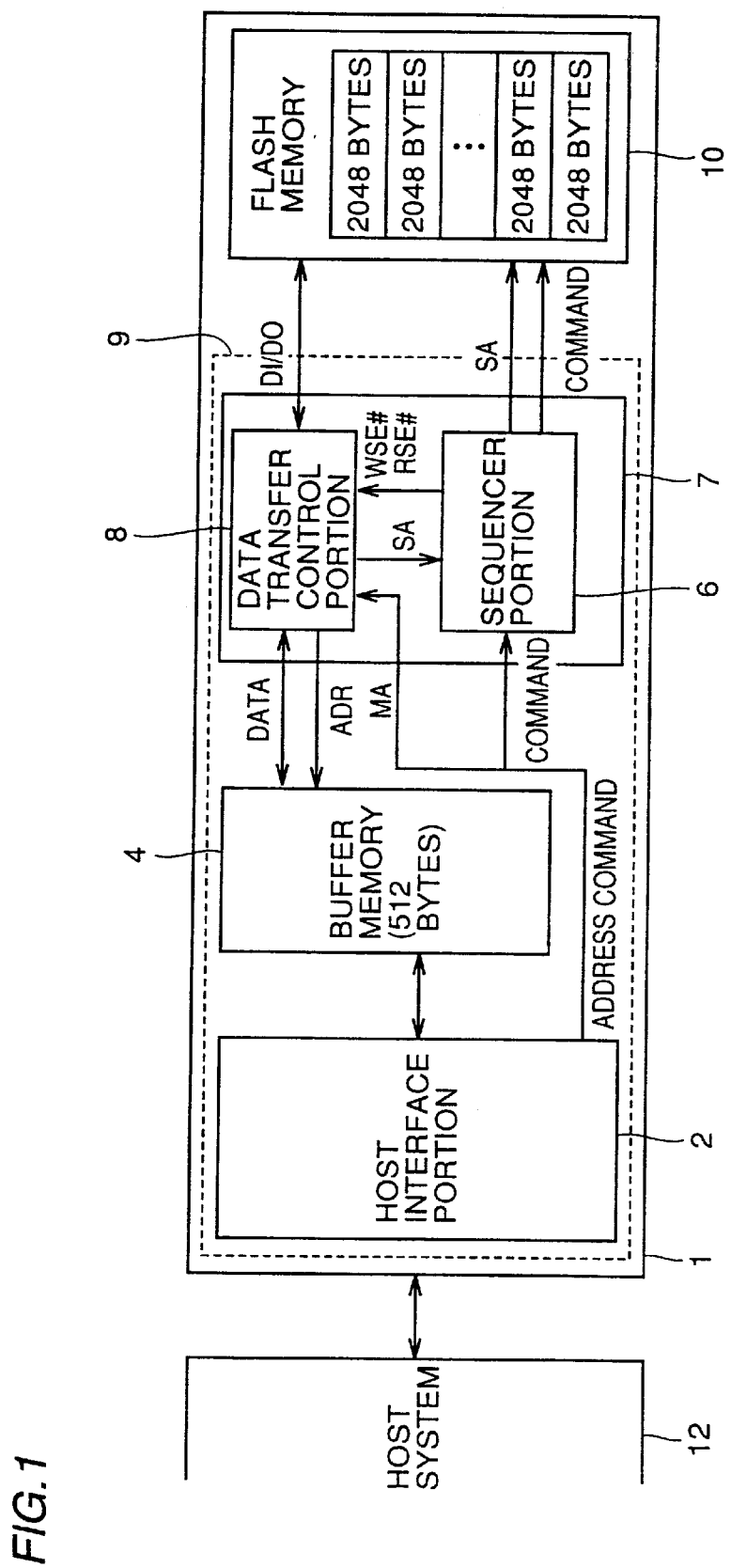
FIG. 1 is a block diagram showing a schematic configuration of a memory device 1 having a flash memory.

The embodiments of the present invention will be described in detail below with reference to the drawings. In the drawings, some reference characters denote the same reference or corresponding portions.

First Embodiment

FIG. 1 is a block diagram showing a schematic configuration of a memory device 1 having a flash memory.

In FIG. 1, a memory device 1 is provided for transmitting to and receiving from a host system 12 the external data to be stored. Memory device 1 includes a data input/output portion 9 for receiving a medium address from the host system to perform the address conversion and for performing the data conversion so as to allow the transmission and the reception of the external data between the memory device and the host system, and a flash memory 10 for performing the data transmission and reception according to an address signal converted by data input/output portion 9. Data input/output portion 9 performs the data conversion from the data to be input into or output from flash memory 10 into the external data, and vice versa.

Data input/output portion 9 includes a host interface portion 2 for performing the data transfer with the host system, a buffer memory 4 having a capacity of 512 bytes for temporarily storing a portion of sector data of a flash memory to allow host interface portion 2 to perform the data transfer with host system 12, a flash interface portion 7 for controlling the data transmission and reception between buffer memory 4 and the flash memory according to a command from host interface portion 2, and a flash memory 10 which is a semiconductor device for holding the data to be stored in memory device 1.

Flash interface portion 7 includes a sequencer portion 6 for sending, to the flash memory according to the specification of the flash memory, a command for setting the operation such as the read or write operation and an address for specifying a memory region during the read or write operation, and a data transfer control portion 8 for generating from a medium sector address provided from host system 12 a sector address and a column address offset of the flash memory.

Flash memory 10 has a plurality of sectors, each of which having a capacity of 2084 bytes. When the sector address is specified, flash memory 10 can serially output 2048 bytes of data stored in the specified sector.

Figure 2:
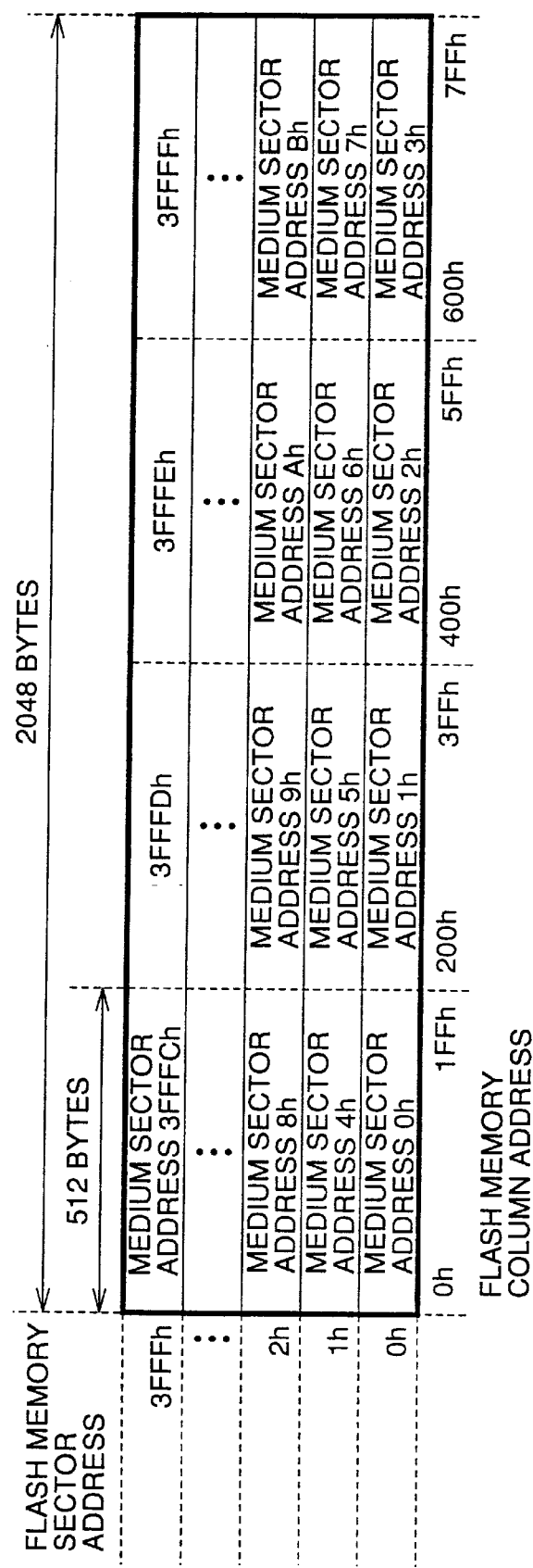
FIG. 2 s a memory map showing the correspondence between a medium sector address and an address of the flash memory in the first embodiment.

FIG. 2 is a memory map showing the correspondence between a media sector address and an address of the flash memory in the first embodiment.

Shown in FIG. 2 is the memory map in the case in which medium sector capacity, or a sector capacity which is a unit by which memory device 1 transmits and receives data at a time, is 512 bytes and the capacity of a sector of flash memory 10 is 2048 bytes. A one-fourth sector of flash memory 10 is assigned as a medium sector.

For instance, a medium sector address 0h corresponds to flash memory column addresses 0h to 1FFh of a flash memory sector address 0h. A medium sector address 1h corresponds to flash memory column addresses 200h to 3FFh of flash memory sector address 0h. Similarly, a medium sector address 2h corresponds to flash memory column addresses 400h to 5FFh of flash memory sector address 0h. A medium sector 3h corresponds to flash memory column addresses 600h to 7FFh of flash memory sector address 0h. Thus, each flash memory sector address is divided into four regions, and the lead address of each divided region is assigned for a medium sector address.

Figure 3:
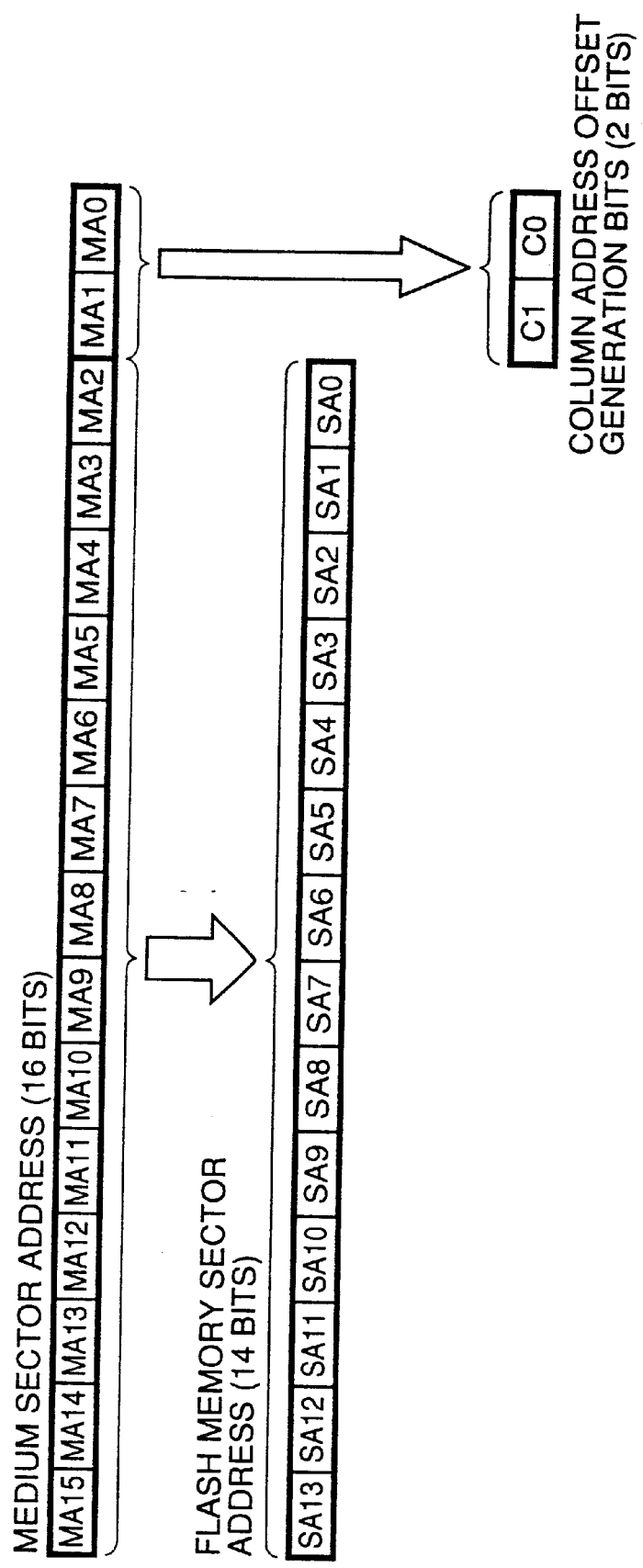
FIG. 3 is a diagram relating to the description of the conversion of a medium sector address into a flash sector address and column address offset generation bits.

FIG. 3 is a diagram relating to the description of the conversion of a medium sector address into a flash memory sector address and column address offset generation bits.

As seen in FIG. 3, the 14 higher bits MA15 to MA2 of a medium sector address are used as flash sector address bits SA13 to SA0. In addition, MA1 and MA0 which are the two lower bits in a medium sector address are used as column address offset generation bits C1 and C0, and a column address offset described below is generated from these column address offset generation bits.

FIG. 4 is a diagram showing the relation between the column address offset and the two lower bits of the medium sector address.

As seen in FIG. 4, when MA1 and MA0 are both 0's, the column address offset is set to 0h, and the transmission and the reception of 512 bytes of data which is the medium sector capacity take place between the buffer memory and the flash memory.

When MA1 and MA0 are 0 and 1, respectively, the column address offset is set to 200h, and the data transmission and reception take place between the buffer memory and the flash memory.

When MA1 and MA0 are 1 and 0, respectively, the column address offset is set to 400h, and the data transmission and reception take place between the buffer memory and the flash memory.

When MA1 and MA0 are both 1's, the column address offset is set to 600h, and the data transmission and reception take place between the buffer memory and the flash memory.

Figure 5:
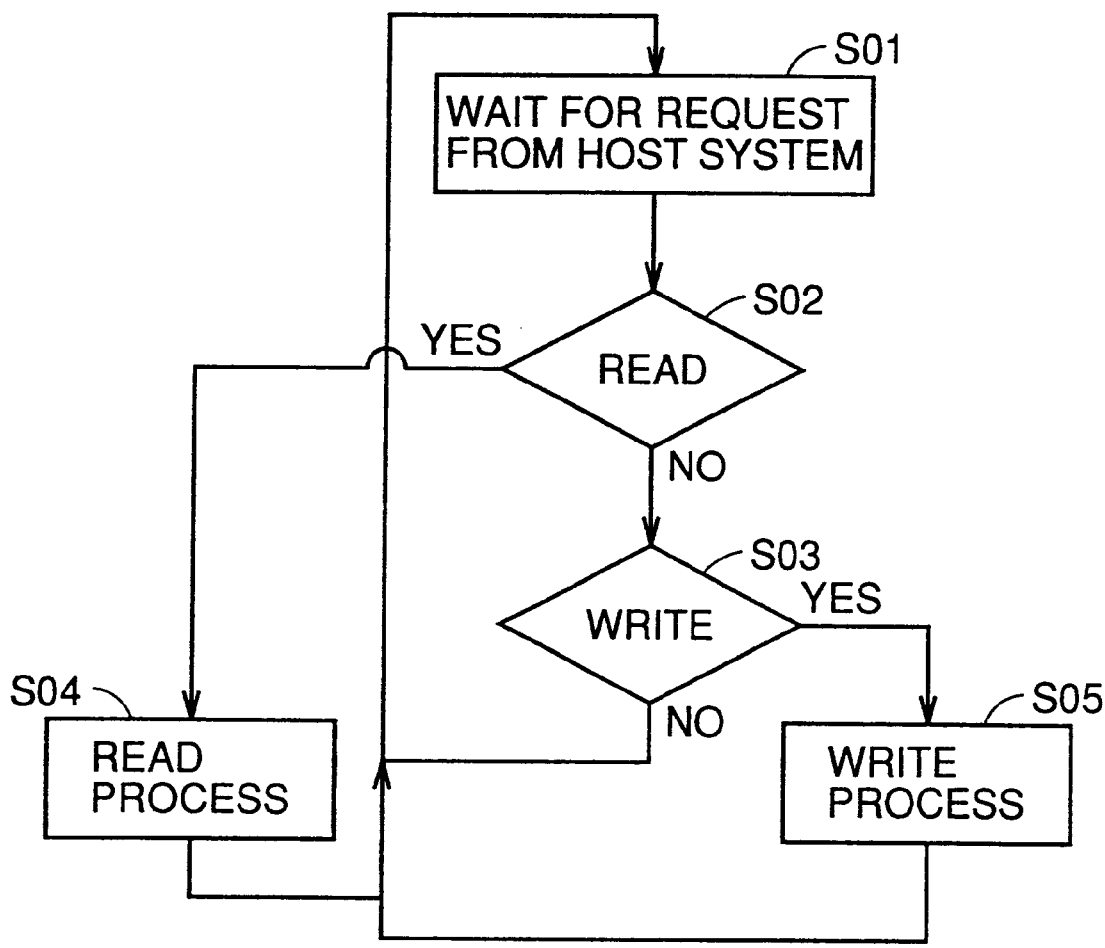
FIG. 5 is a diagram showing the main flow of the processing of the memory device in the first embodiment.

FIG. 5 is a diagram showing the main flow of the processing of the memory device in the first embodiment.

As seen in FIG. 5, in step S01, the memory device waits for a request from the host system. Then step S02 determines whether a read request has been made. If the read request has been made, the read process is performed in step S04. When the read process is complete, a return is made to step S01 and once again the memory device waits for a request from the host system.

If no read request has been made in step S02, step S03 is performed. Step S03 determines whether a write request has been made by the host system. If the write request has been made, the write process is performed in step S05. When the write process is complete, a return is made to step S01 and once again the memory device waits for a request from the host system.

If no write request has been made in step S03, a return is made to step S01, and once again the memory device waits for a request from the host system.

Figure 6:
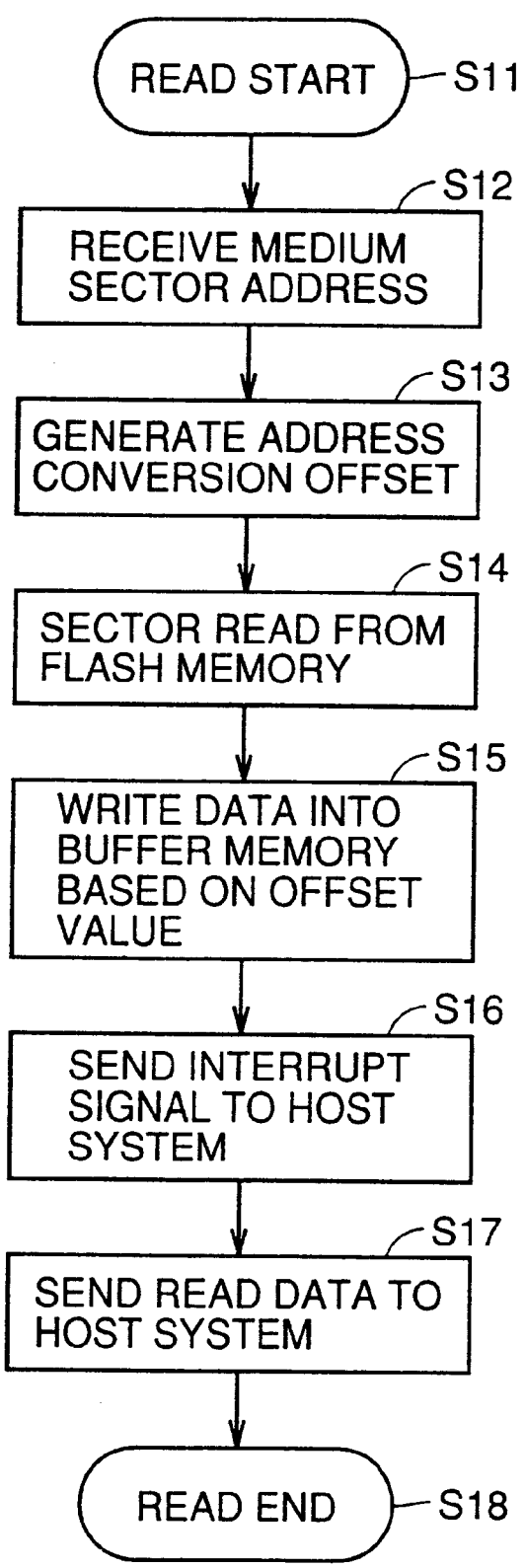
FIG. 6 is a flow chart representing in detail the read process of step S04 shown in FIG. 5.

FIG. 6 is a flow chart representing in detail the read process of step S04 shown in FIG. 5.

As seen in FIG. 6, the read process is started in step S11.

In step S12, the memory device receives the medium sector address from the host system. Then, the address conversion is performed based on the medium sector address received, and the value of the column address offset shown in FIG. 4 is generated.

Thereafter, in step S14, a sector read operation is performed from the flash memory. The data read out is written into the buffer memory based on the offset value in step S15. Then in step S16, an interrupt signal is sent to the host system, and in step S17 the data written into the buffer memory is sent as read data to the host system. The read operation ends in step S18.

Figure 7:
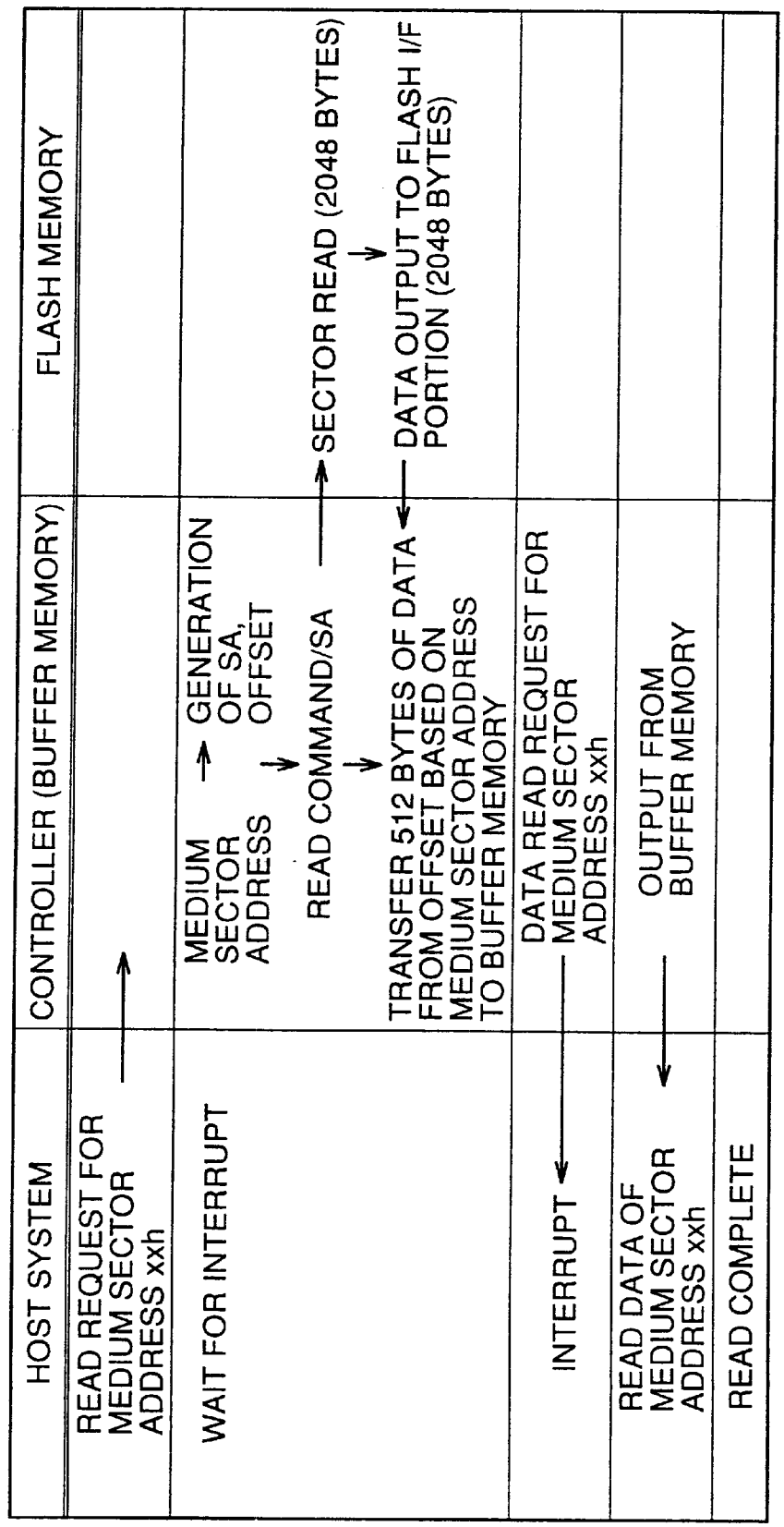
FIG. 7 is a diagram illustrating the relation between the steps of the read process shown in FIG. 6 and the respective blocks in the memory device in which the steps are performed.

FIG. 7 is a diagram illustrating the relation between the steps of the read process shown in FIG. 6 and the respective blocks in the memory device in which the steps are performed.

As seen in FIG. 7, a read request for the medium sector address is transmitted to a controller from the host system. The term "controller" refers to a portion including host interface portion 2, flash interface sequencer portion 6, and the buffer memory in FIG. 1.

Consequently, a sector address SA and an offset value of the flash memory is generated from the medium sector address in the controller. Then, a read command and sector address SA are transmitted to the flash memory. As a consequence, the sector read operation is performed in the flash memory, and 2048 bytes of data is sent successively to the controller as a flash interface data output. Then the controller takes out the 512 bytes data corresponding to the offset based on the medium sector address and transfers the data to the buffer memory.

When the storing of data into the buffer memory is completed, the controller makes a read request for the data from the medium sector address, and the host system accepts an interrupt. Thereafter, the controller outputs data from the buffer memory, whereby the data read operation of the medium sector address is performed. Then the read operation is completed.

Figure 8:
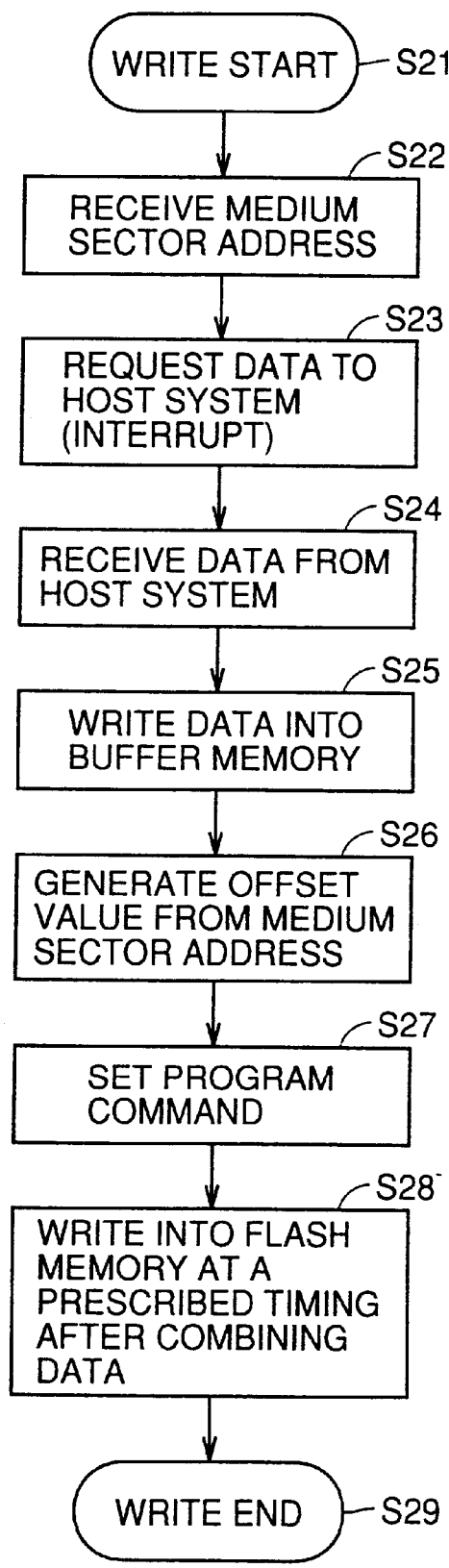
FIG. 8 is a flow chart illustrating in detail the write process in step S05 shown in FIG. 5.

FIG. 8 is a flow chart illustrating in detail the write process in step S05 shown in FIG. 5.

As seen in FIG. 8, the write operation starts in step S21.

Then, in step S22 the medium sector address transmitted from the host system is received by the memory device.

In step S23, the memory device requests the host system to send data, and in step S24, the memory device receives the data from the host system. The data is written into the buffer memory in step S25.

In step S26 an offset value is generated from the medium sector address received in step S22. Then, in step S27 a program command for the flash memory is set. In step S28 data from the buffer memory and the initial value data are combined, and the combined data is written into the flash memory at a prescribed timing.

The write operation ends in step S29.

Figure 9:
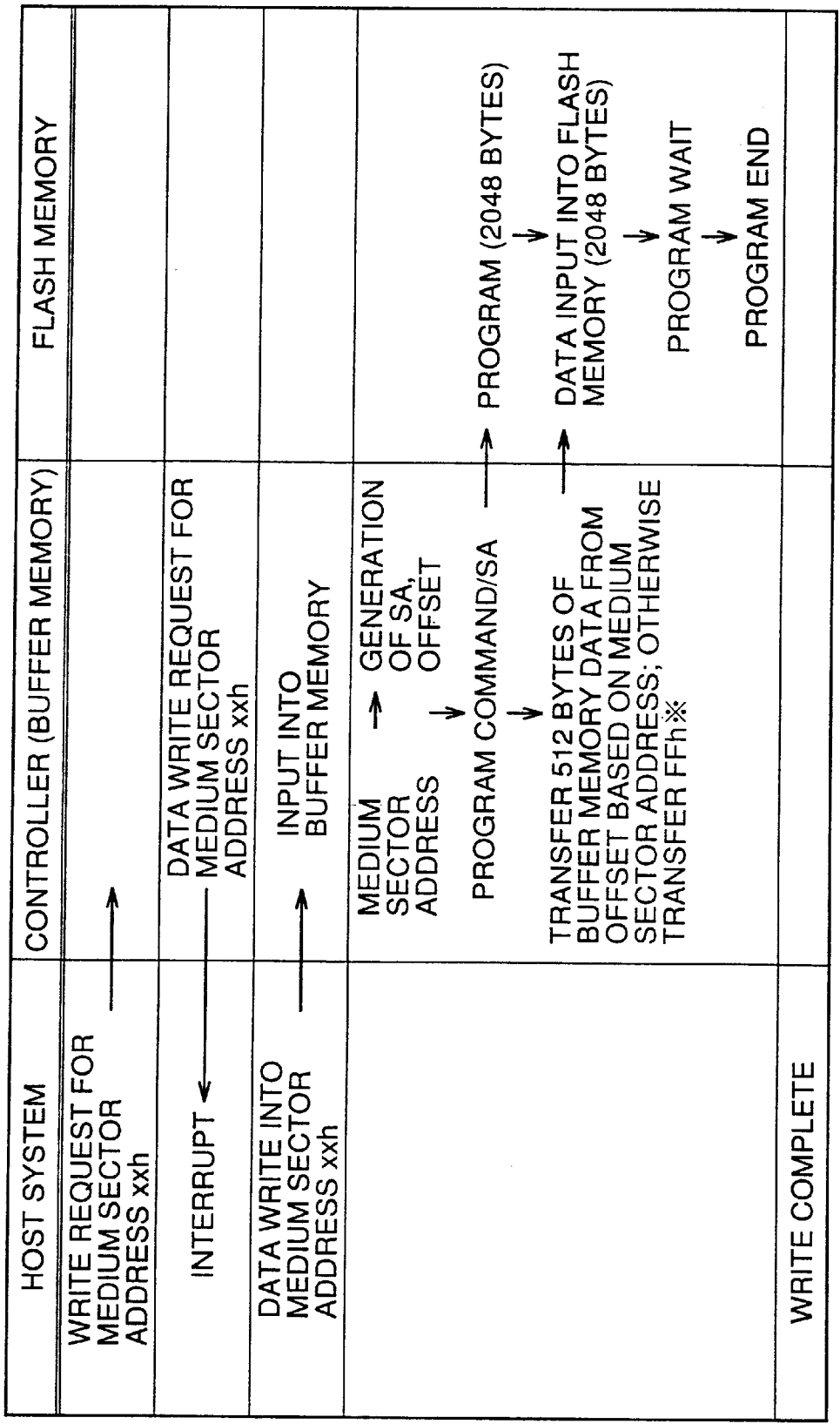
FIG. 9 is a diagram showing how each step of the write process shown in FIG. 8 is performed between a host system and a controller, and between the controller and a flash memory.

FIG. 9 is a diagram showing how each step of the write process shown in FIG. 8 is performed between the host system and the controller, and between the controller and the flash memory.

As seen in FIG. 9, first, a write request for the medium sector address is transmitted from the host system to the controller. The controller receives this request and makes a data write request for the medium sector address to the host system. In response, the host system writes the data into the medium sector address. The data is input into the buffer memory via the controller.

In the controller, a sector address and an offset value of the flash memory are generated from the medium sector address which had been received. The program command and the sector address are transmitted to the flash memory.

Consequently, the flash memory is rendered data writable. Moreover, according to a prescribed signal from the controller the stored 512 byte data is transferred from the buffer memory based on the offset value. Of the entire time period in which the write data is being transferred to the flash memory, the time period other than the time period in which data stored in the buffer memory is transferred involves the transfer of write data "FFh." After the write data including the buffer memory data is input into the flash memory, the write operation ends after a prescribed wait time.

Now, write data "FFh" will be described.

Each memory cell in the flash memory is formed by an MOS transistor having a floating gate. Each memory cell holds data "1" or "0" depending on the state of the threshold voltage of the MOS transistor. In general, the state of the memory cell immediately after erasing the data of the memory cell corresponds to the held data "1." When data "0" is written, the threshold voltage changes, and the state of the memory cell having the threshold voltage after the change corresponds to the held data "0." On the other hand, when data "1" is written, the threshold voltages does not change. Therefore, even when data "1" is written into the memory cell which holds data "0" as the initial state, the held data does not change.

Thus, although the data write operation is normally performed after the memory data is erased, "FFh" is written as the data without performing the erase operation in the first embodiment. "FFh" is one-byte data containing all "1" bits so that the flash memory retains the data it held before the write operation.

Figure 10:
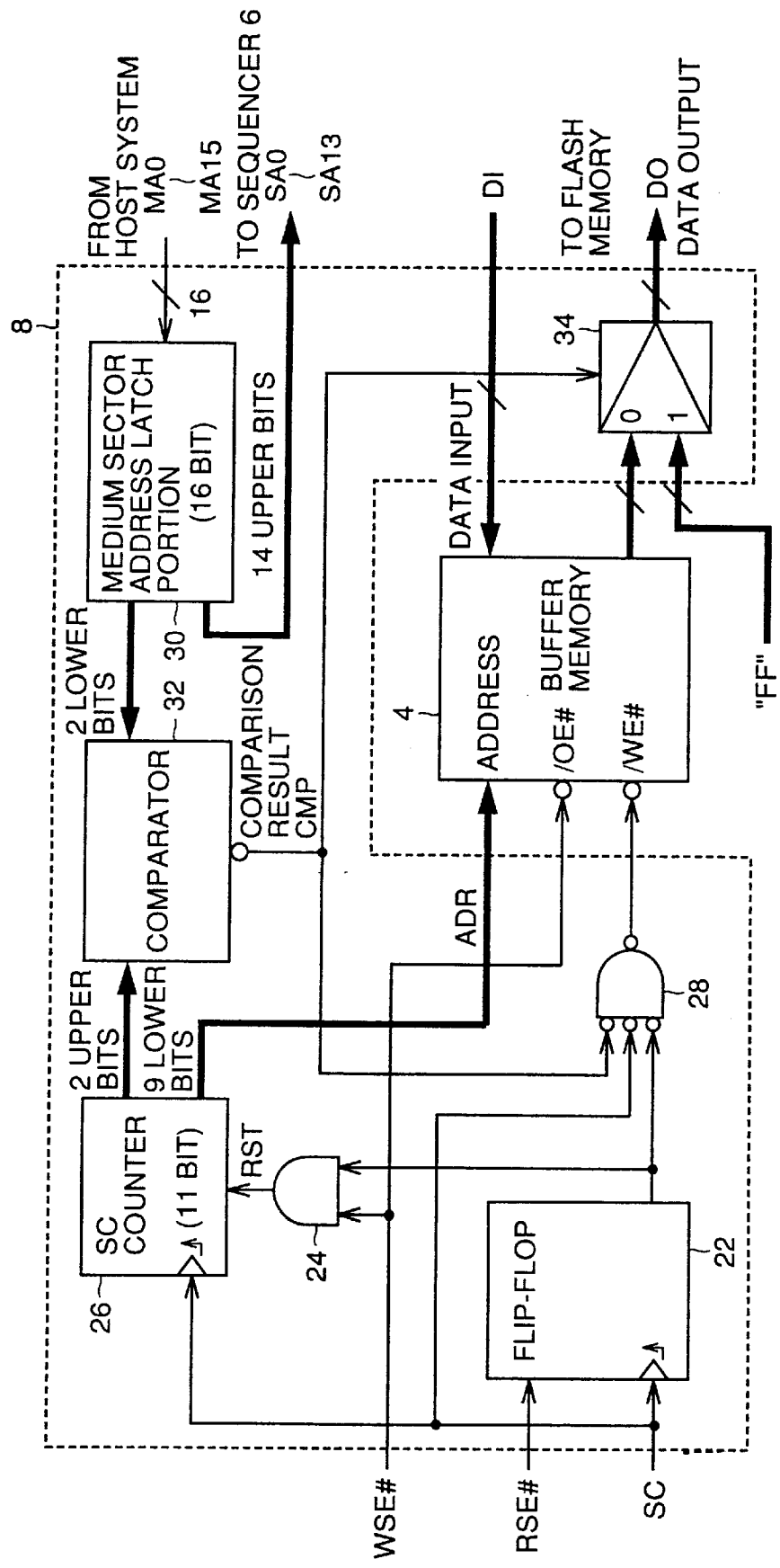
FIG. 10 is a block diagram representing in detail a data transfer control portion 8 shown in FIG. 1.

FIG. 10 is a block diagram representing in detail a data transfer control portion 8 shown in FIG. 1.

As seen in FIG. 10, data transfer control portion 8 includes a flip-flop 22 for latching in synchronism with the rise of a clock signal SC a read sector enable signal RSE# generated inside the memory device, an AND circuit 24 for outputting as a reset signal RST the logical sum of the output from flip-flop 22 and a write sector enable signal WSE# generated inside the memory device, an SC counter 26 which is reset by reset signal RST and thereafter starts the count-up in response to the rise of clock signal SC, a medium sector address latch portion 30 for latching a 16 bit medium sector address from the host system and for outputting the 14 higher bits as a sector address SA0 to SA15 to sequencer portion 6, and a comparator 32 for comparing the 2 higher bits of the 11 bit count value of the output from SC counter 26 with the 2 lower bits of the medium sector address latched by medium sector address latch portion 30.

Comparator 32 outputs a comparison result signal CMP that attains a low or logic "L" level when the 2 bit data from SC counter 26 matches the 2 bit data from medium sector address latch portion 30.

Data transfer control portion 8 further includes a gate circuit 28 which receives the output from flip-flop 22, clock signal SC, and result signal CMP and outputs a write enable signal /WE#, and a selector 34 which receives the output from buffer memory 4 and the fixed data "FFh" and outputs either of the received output from buffer memory 4 or "FFh" to the flash memory according to comparison result signal CMP. Selector 34 outputs to the flash memory the output from the buffer memory when comparison signal CMP is at a logic "L" level, and outputs fixed data "FFh" to the flash memory when comparison signal CMP is at a high or logic "H" level.

For ease of description, buffer memory 4 is illustrated additionally in FIG. 10. Buffer memory 4 receives the 9 lower bits of the 11 bit count value of SC counter 26 as an address signal ADR, write sector enable signal WSE# as an output enable signal /OE#, and the output of gate circuit 28 as write enable signal /WE#, and, in response to these signals, holds data input DI from the flash memory, or sends data output DO to the flash memory via selector 34.

Figure 11:
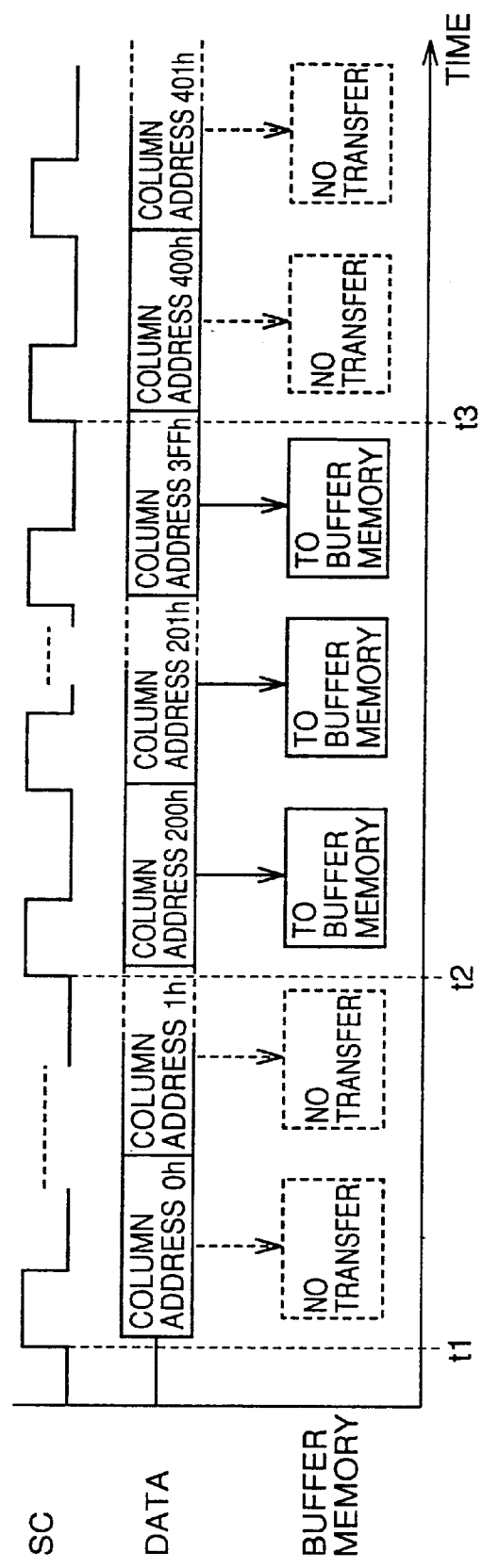
FIG. 11 is a timing diagram showing the manner of data transfer from the flash memory to the buffer memory.

FIG. 11 is a timing diagram showing the manner of data transfer the flash memory to the buffer memory.

As shown in FIG. 11, a data signal DATA is read from the flash memory according to clock signal SC from time T1. Since this read operation is performed sector by sector, normally 2048 bytes of data is read out continuously thereafter.

Here, when the 2 lower bits (MA1, MA0) of the medium sector address specified by the host system are (0, 1), the data read out from the flash memory is not transferred to the buffer memory between time t1 and time t2.

From time t2 to time t3, while data corresponding to column addresses 200h to 3FFh is read out from the flash memory, this data is transferred to and retained in the buffer memory. This retained data is 512 bytes or one-fourth of 2048 bytes of the sector capacity read out from the flash memory.

After time t3, data corresponding to column address 400h and onward is read out successively. This data, however, is not retained in the buffer memory.

Figure 12:
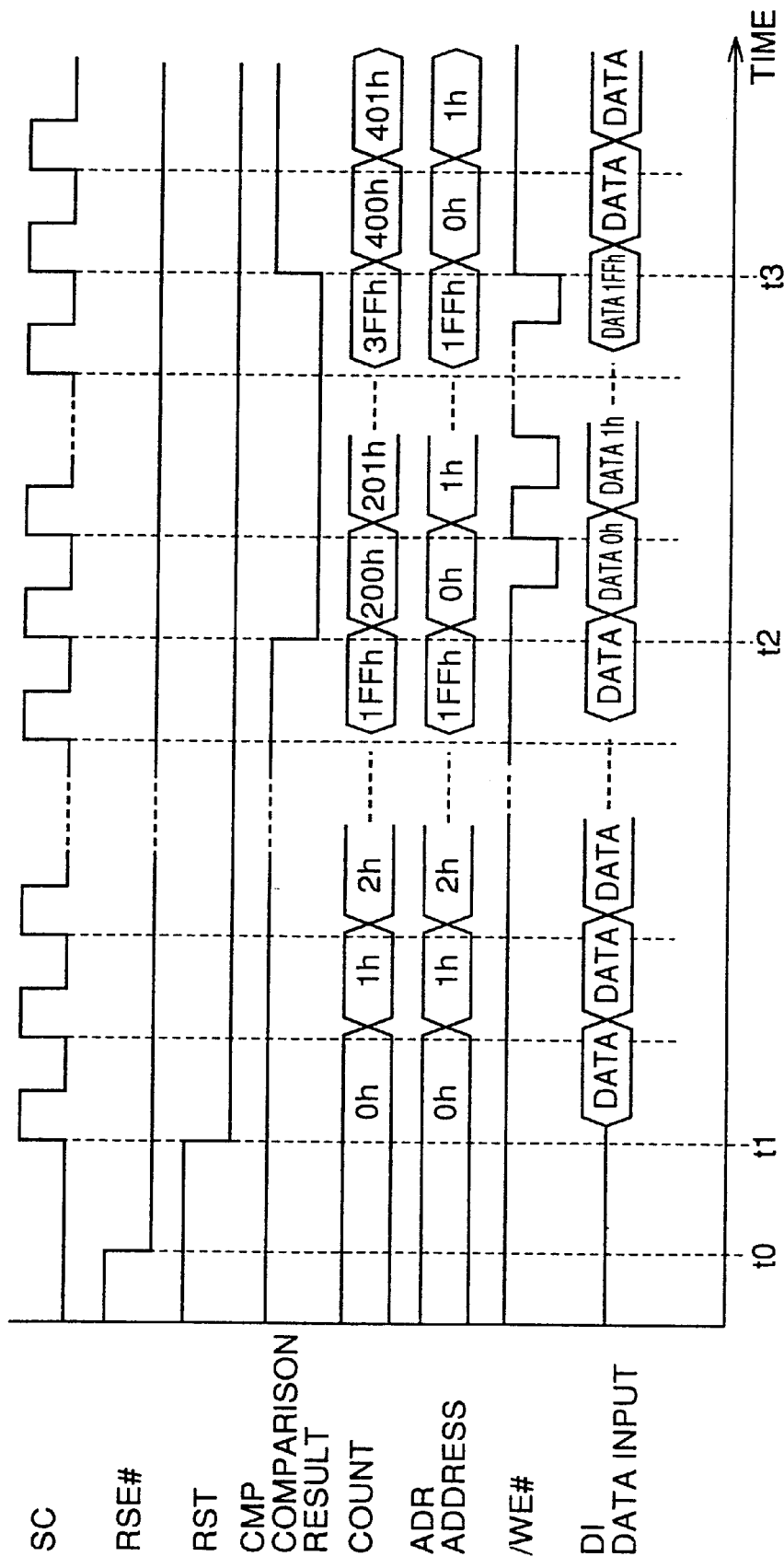
FIG. 12 is an operation waveform chart illustrating in detail the data write operation to the buffer memory shown in FIG. 11.

FIG. 12 is an operation waveform chart illustrating in detail the data write operation to the buffer memory shown in FIG. 11.

As seen in FIGS. 10 and 12, at time t0, read sector enable signal RSE# falls from a logic "H" level to a logic "L" level with the read request being made from the host system. Then, at time tl, reset signal RST falls from the logic "H" level to the logic "L" level, and the reset of SC counter 26 is released. Thereafter, from time tl to time t2, SC counter 26 counts up the 11 bit count value from 0h to 1FFh according to the input of clock signal SC. Similarly, address signal ADR, which is the 9 lower bits of the count value and is input into the buffer memory, changes from 0h to 1FFh. At this time, since the 2 higher bits of the count value input into comparator 32 are (0, 0), while the 2 bits input from medium sector address latch portion 30 are (0, 1), comparison result signal CMP is at the logic "H" level indicating a mismatch. Thus, from time tl to time t2, the content of data input signal DI is not written into buffer memory 4.

At time t2, the count value of SC counter 26 attains 200h, and the 2 higher bits of the count value match the 2 bit signal input from medium sector address latch portion 30. Accordingly, comparison result signal CMP falls from the logic "H" level to the "L" level. Comparison result signal CMP maintains the logic "L" level while the count value is between 200h to 3FFh. According to the change in this comparison result signal CMP, gate circuit 28 outputs clock signal SC as write enable signal /WE# to the buffer memory. Since write enable signal /WE# is input into buffer memory 4, the input data, data 0h to data 1FFh, are written into the address indicated by address signal ADR at the leading edge of write enable signal /WE#.

Since the count value of SC counter 26 is 400h or greater after time t3, comparison result signal CMP once again attains the logic "H" level, and data to be input thereafter is not written into the buffer memory.

Figure 13:
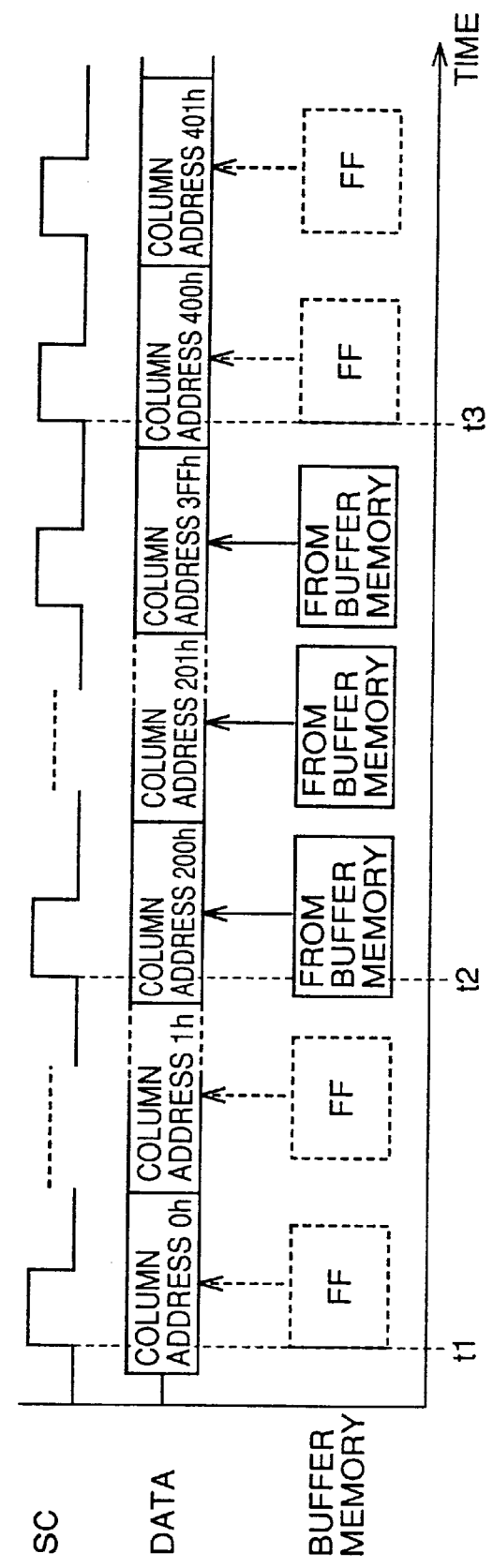
FIG. 13 is a timing diagram showing the manner of data transfer from the buffer memory to the flash memory.

FIG. 13 is a timing diagram showing the manner of data transfer from the buffer memory to the flash memory.

As seen in FIG. 13, when medium sector address (MA1, MA0) is (0, 1), dummy data "FFh" is written into column addresses 0h to 1FFh of the flash memory from time t1 to time t2. The dummy data is the data corresponding to the initial value held immediately after the flash memory is erased. In general, data held inside the flash memory is not destroyed by writing such initial value data into the flash memory.

Thus, the memory device according to the first embodiment is most suitable for use including, for instance, the temporary storage of digital camera images, the storage of acoustic signals of portable digital audio equipment, and the like, where stored data is erased one unit at a time, and thereafter, new data is added in order into the unit that was erased.

From time t2 to time t3, data from the buffer memory is successively written into column addresses 200h to 3FFh of the flash memory. This data is 512 bytes corresponding to one-fourth of the sector capacity of the flash memory.

After time t3, dummy data "FFh" is written as is the case between time t1 and time t2.

Figure 14:
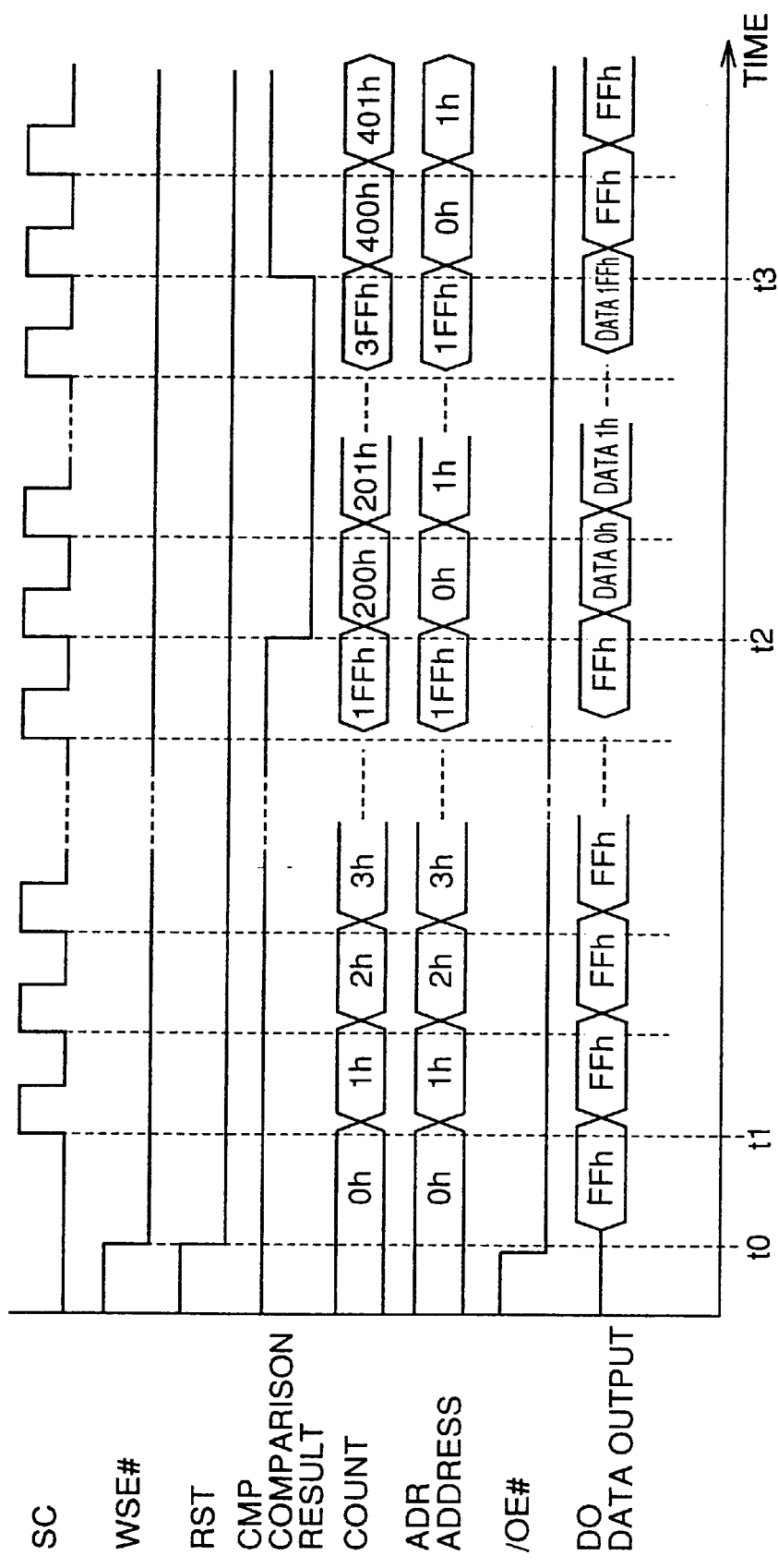
FIG. 14 is an operation waveform chart relating to a more detailed description of the manner of data transfer from the buffer memory to the flash memory shown in FIG. 13.

FIG. 14 is an operation waveform chart relating to a more detailed description of the manner of data transfer from the buffer memory to the flash memory shown in FIG. 13.

As seen in FIGS. 10 and 14, at time t0 write sector enable signal WSE# falls from the logic "H" level to the "L" level in response to the write request from the host system. Accordingly, reset signal RST falls from the logic "H" level to the logic "L" level, and the reset of SC counter 26 is released. In addition, output enable input signal /OE# of the buffer memory falls from the "H" level to the "L" level, and buffer memory 4 becomes accessible.

From time t1 to time t2, the data output signal output from selector 34 is written into the flash memory in synchronism with the rise of clock signal SC. The count value corresponding to the write column address at this time is count up by SC counter 26. Since medium sector address (MA1, MA0) does not match the 2 higher bits of SC counter 26 between time t1 and time t2, data output signal DO is fixed data "FFh" output by selector 34 when comparison result signal CMP is at the "H" level.

At time t2, comparison result signal CMP falls from the logic "H" level to the "L" level according to the change in the count value. Data at the address specified by address signal ADR is read from buffer memory 4, and is transferred to the flash memory as data output signal DO via selector 34. From then on until time t3, the data transfer from the buffer memory to the flash memory takes place.

When 512 bytes of data from data 0h to data 1FFh is transferred, comparison result signal CMP rises from the "L" level to the "H" level according to the change in the count value at time t3 so that the data output signal once again attains fixed value "FFh" output by selector 34 when comparison result signal CMP is at the "H" level.

As described above, the memory device according to the first embodiment is most suitable for use including, for instance, the temporary storage of digital camera images, the storage of acoustic signals of portable digital audio equipment, and the like, where data is erased one unit at a time, and thereafter, new data is added in order into the unit that was erased.

When medium sector capacity, which is the capacity unit for data transfer with the host system, is smaller than the capacity of a sector of the flash memory used, the capacity of the buffer memory for the temporary storage of data can be made smaller according to the medium sector capacity so that a memory device having an advantage with respect to the cost can be provided in constructing the hardware.

Second Embodiment

Figure 15:
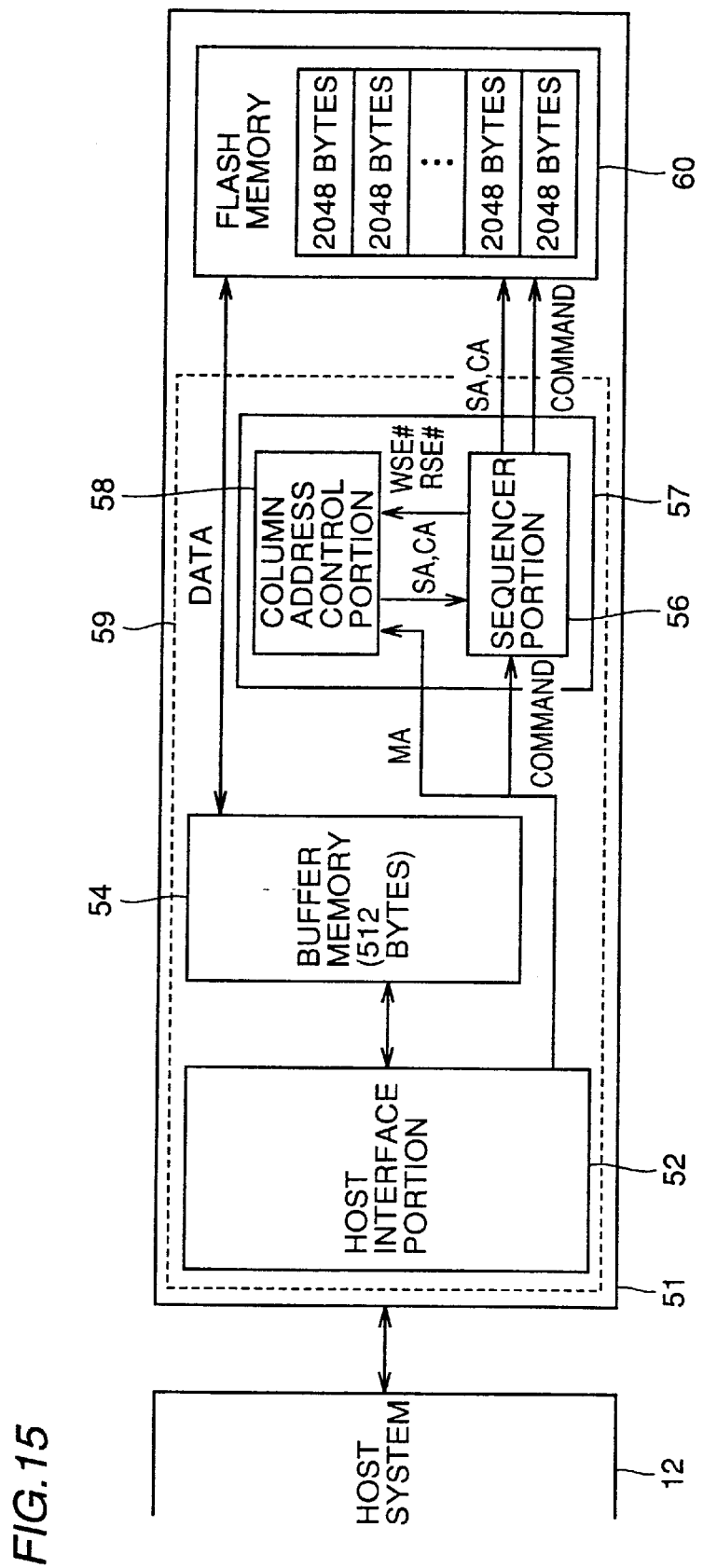
FIG. 15 is a block diagram showing a schematic configuration of a memory device 51 of the second embodiment.

FIG. 15 is a block diagram showing a schematic configuration of a memory device 51 of the second embodiment.

As seen in FIG. 15, a memory device 51 is provided for transmitting to and receiving from a host system 12 the external data to be stored. Memory device 51 includes a data input/output portion 59 for receiving a medium address from the host system to perform address conversion and for performing the data conversion so as to allow the transmission and the reception of the external data between the memory device and the host system, and a flash memory 60 for performing the data transmission and reception according to an address signal converted by data input/output portion 59. Data input/output portion 59 performs the data conversion from the data to be input into or output from flash memory 60 into the external data, and vice versa.

Data input/output portion 59 includes a host interface portion 52 for performing the data transfer with host system 12, a buffer memory 54 having a capacity of 512 bytes for temporarily storing storage data to allow host interface portion 52 to perform the data transfer with host system 12, and a flash interface portion 57 for controlling the data transmission and reception between buffer memory 54 and flash memory 60 according to a command from host interface portion 52.

Flash interface portion 57 includes a sequencer portion 56 for sending, to the flash memory according to the specification of the flash memory, a command for setting the operation such as the read or write operation and an address for specifying a memory region during the read or write operation, and a column address control portion 58 for generating from a medium sector address provided from host system 12 a sector address of the flash memory and a start column address for specifying the read start location of the column specified by the sector address.

In FIG. 15, flash memory 60 has a partial read/program function in which the data read and write operations can be started from any column address of a sector.

Flash memory 60 has a plurality of sectors, each of which having a capacity of 2048 bytes. When the sector address is specified, flash memory 60 can serially output the data corresponding to the specified sector alone in synchronism with a clock signal. Further, when a start column address is specified, the data corresponding to the column address of the specified sector up to the data corresponding to the final address of the sector can be serially output in synchronism with a clock signal.

Figure 16:
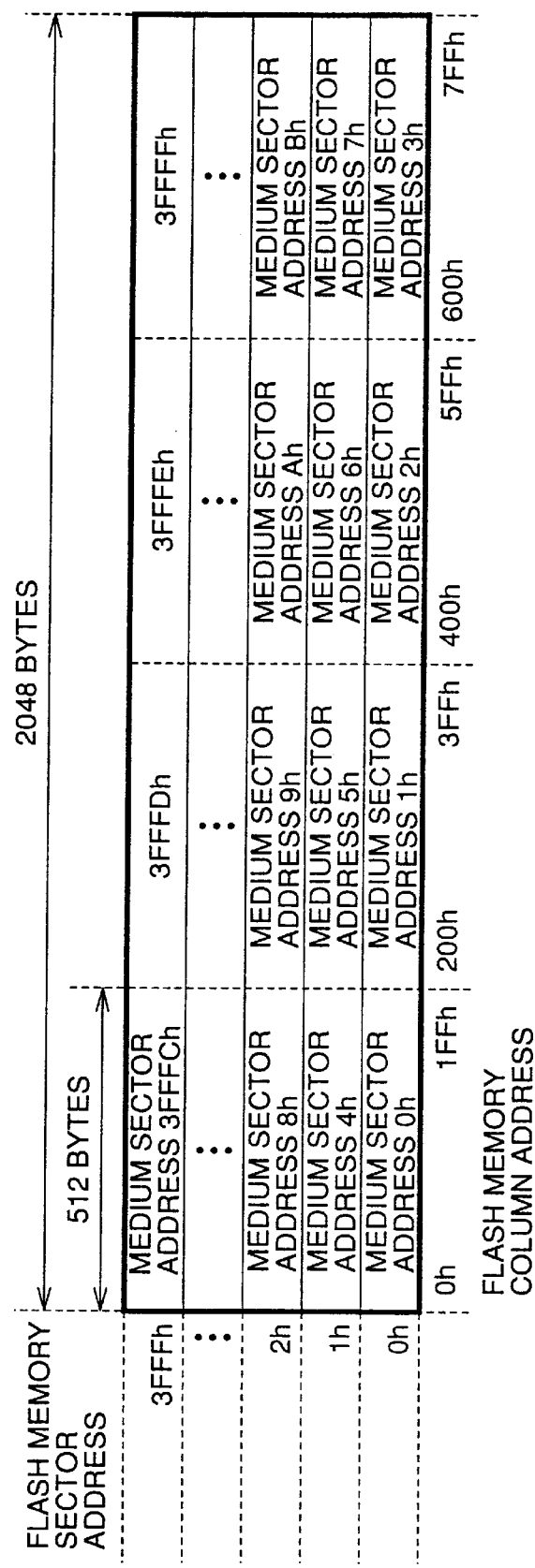
FIG. 16 is a memory map showing the correspondence between a medium sector address and a flash memory address in the second embodiment.

FIG. 16 is a memory map showing the correspondence between a medium sector address and a flash memory address in the second embodiment.

Since the memory map shown in FIG. 16 and the memory map used for the first embodiment shown in FIG. 2 are identical in mapping, the description thereof will not be repeated here.

Figure 17:
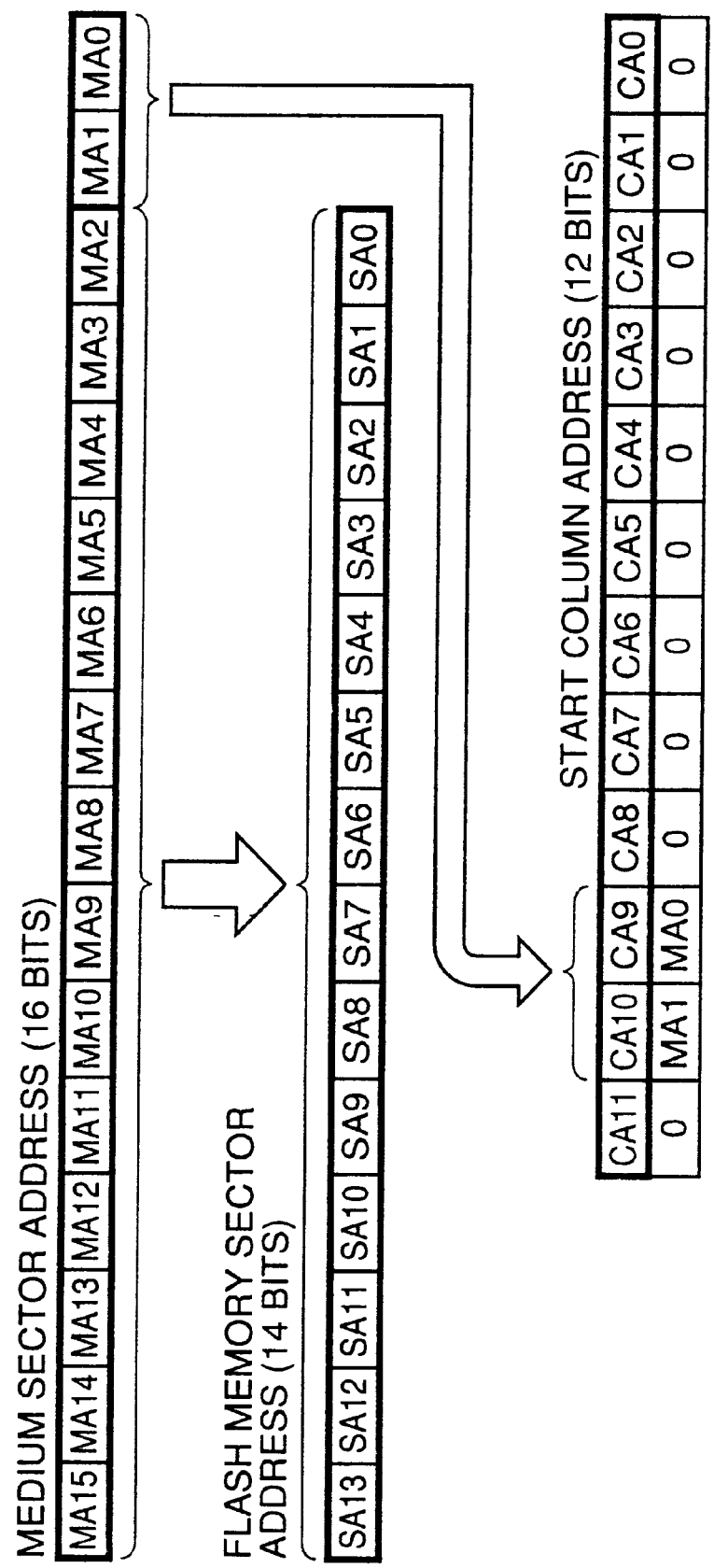
FIG. 17 is a diagram relating to the description of the conversion of a medium sector address into a flash memory sector address and a start column address.

FIG. 17 is a diagram relating to the description of the conversion of a medium sector address into a flash memory sector address and a start column address.

As seen in FIG. 17, the 14 higher bits MA15 to MA2 of a medium sector address are used as bits of a flash sector address SA13 to SA0. In addition, MA1 and MA0 which are two lower bits in a medium sector address are used as CA10 and CA9, respectively, in the start column address. Further, other bits in the start column address, CA11 and CA8 to CA0 are all set to "0h."

Figures 18, 19:
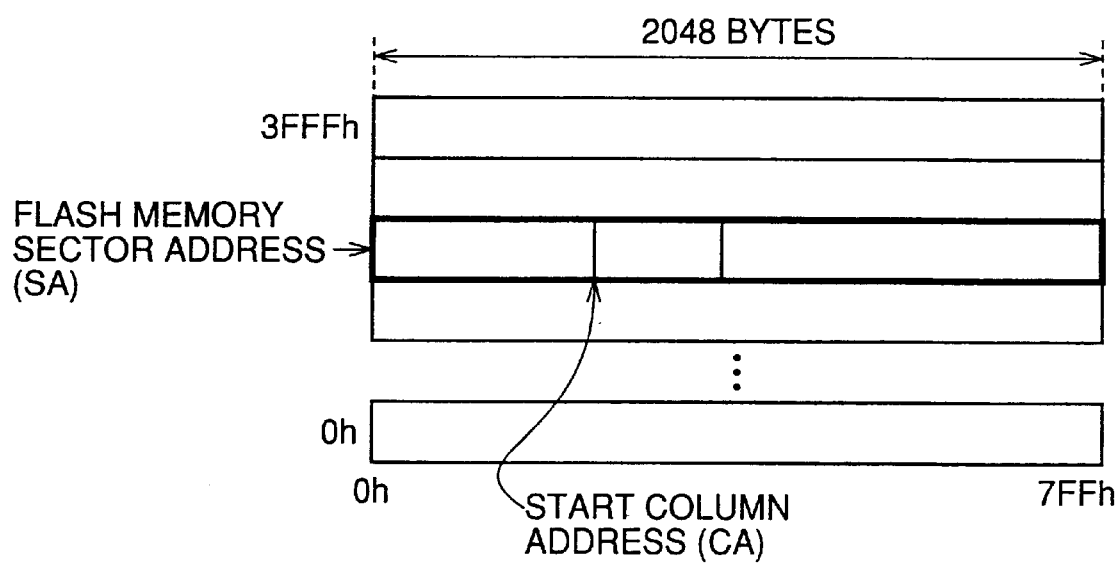
FIG. 18 is a diagram showing the relation between a start column address and the two lower bits of the medium sector address.
FIG. 19 is a conceptual diagram relating to the description of a start column address.

FIG. 18 is a diagram showing the relation between the start column address of the flash memory and the two lower bits of a medium sector address.

As seen in FIG. 18, when MA1 and MA0 are both 0's, the start column address is set to 0h, and when MA1 and MA0 are 0 and 1, respectively, the start column address is set to 200h.

When MA1 and MA0 are 1 and 0, respectively, the start column address is set to 400h, and when MA1 and MA0 are both 1's, the start column address is set to 600h. The address conversion is performed in column address control portion 58 of FIG. 15, which is readily implemented by providing the wiring connection corresponding to FIG. 18.

FIG. 19 is a conceptual diagram relating to the description of a start column address.

As seen in FIG. 19, when one sector contains 2048 bytes, column addresses of 0h to 7FFh exist corresponding to flash sector address SA. When start column address CA is set, the read operation is started, in synchronism with a clock signal, from the data of the column corresponding to the start column address in the set flash sector address SA being set.

Figure 20:
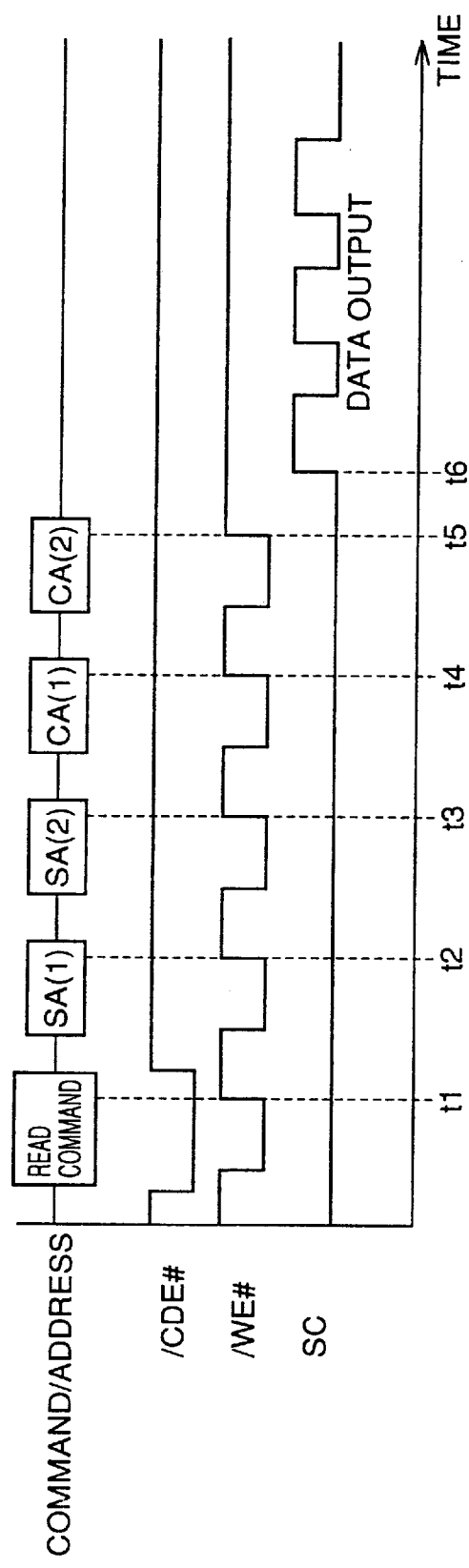
FIG. 20 is an operational waveform chart relating to the description of the command setting and the address setting when reading data from the flash memory having a partial read/program function.

FIG. 20 is an operational waveform chart relating to the description of the command setting and the address setting when reading data from the flash memory having a partial read/program function.

As seen in FIG. 20, at time t1, when the rise of write enable signal /WE# is detected while a command data enable signal /CDE# is at the "L" level, a read command is taken into the flash memory at the time of detection.

At time t2, SA(1) which is the 8 lower bits of the sector address is taken into the flash memory at the leading edge of write enable signal /WE#. Then at time t3, SA(2) which is the 6 higher bits of the sector address is taken into the flash memory at the leading edge of write enable signal /WE#.

Thereafter, at time t4, CA(1) which is the 8 lower bits of start column address CA is taken into the flash memory at the leading edge of write enable signal /WE#. Then at time t5, CA(2) which is the 4 higher bits of the start column address is taken into the flash memory at the leading edge of write enable signal /WE#.

After time t6, data is output from the flash memory from an address/data input/output terminal in synchronism with clock signal SC, starting with the data from the specified start column address.

Figure 21:
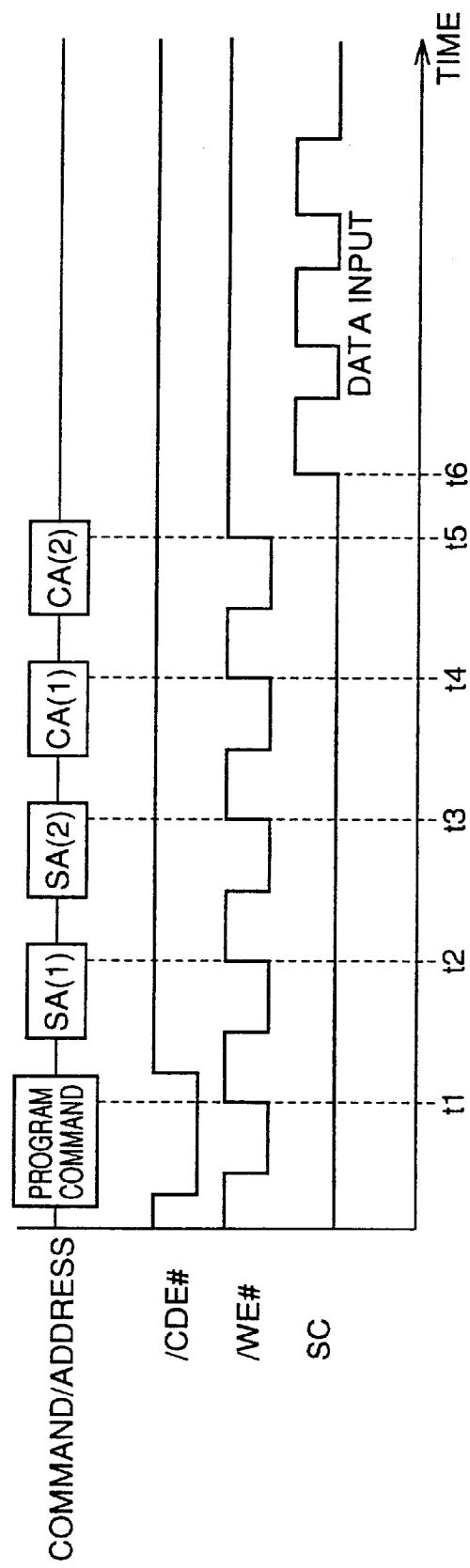
FIG. 21 is a diagram showing an input waveform when writing data into the flash memory in the second embodiment.

FIG. 21 is a diagram showing an input waveform when writing data into the flash memory in the second embodiment.

As seen in FIG. 21, at time t1, when the leading edge of write enable signal /WE# is detected while command data enable input /CDE# is at the "L" level, a program command is taken into the flash memory.

Thereafter, at time t2, SA(1) which is the 8 lower bits of the sector address is taken into the flash memory at the leading edge of write enable signal /WE#. Then at time t3, SA(2) which is the 6 higher bits of the sector address is taken into the flash memory at the leading edge of write enable signal /WE#.

At time t4, CA(1) which is the 8 lower bits of the start column address is taken into the flash memory at the leading edge of write enable signal /WE#. Then at time t5, CA(2) which is the 4 higher bits of the start column address is taken into the flash memory at the leading edge of write enable signal /WE#. Thus, the address setting is completed.

After time t6, data is input serially in synchronism with clock signal SC starting with the data corresponding to the start column address of the sector address which was set, and the data is written into a corresponding address.

The provision of a command or an address signal to the flash memory shown in FIGS. 20 and 21 is controlled by flash interface sequencer portion 56 in FIG. 15.

Figure 22:
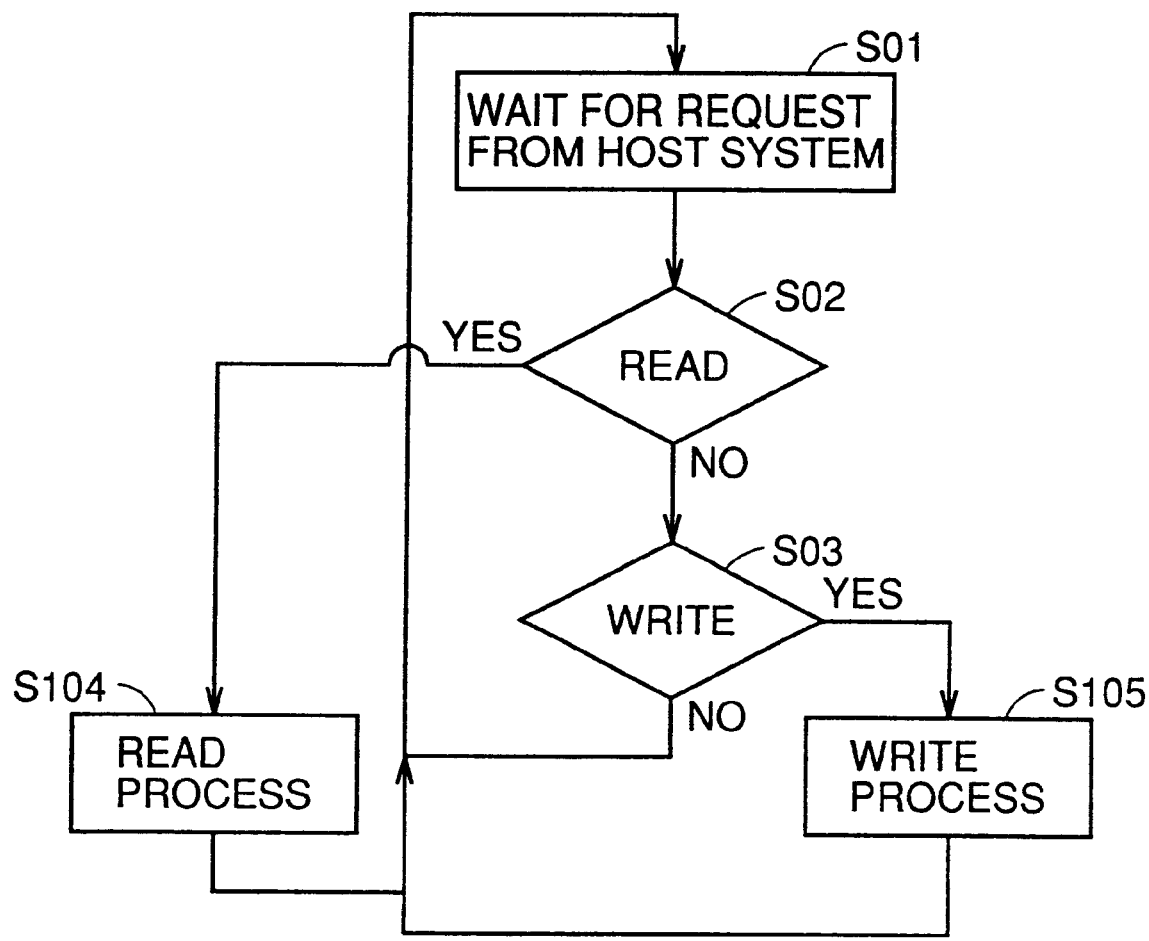
FIG. 22 is a diagram showing the main flow of the processing of the memory device in the second embodiment.

FIG. 22 is a diagram showing the main flow of the processing of the memory device in the second embodiment.

As shown in FIG. 22, the main flow of the processing of the memory device in the second embodiment differs from the flow shown in FIG. 5 in that read process step S04 of the first embodiment shown in FIG. 5 is replaced by step S104, and that write process step S05 is replaced by step S105. Other parts are identical to the flow shown in FIG. 5, and the description thereof will not be repeated.

Figure 23:
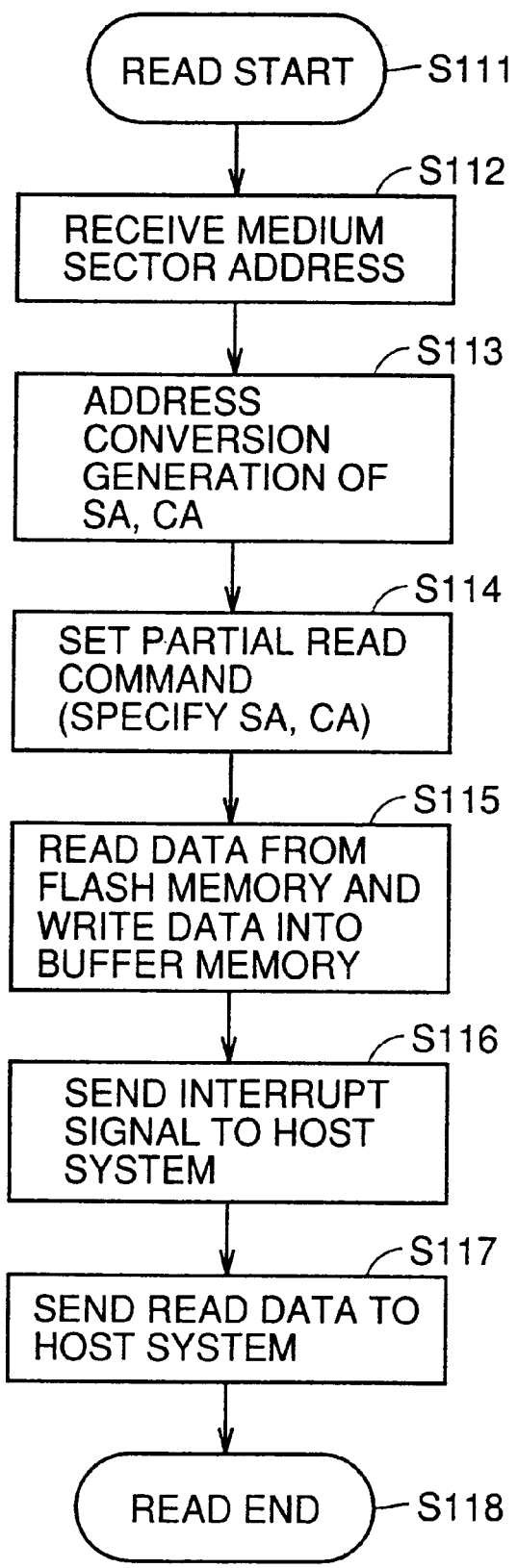
FIG. 23 is a flow chart representing in detail the read process of step S104 shown in FIG. 22.

FIG. 23 is a flow chart representing in detail the read process of step S104 shown in FIG. 22.

As seen in FIG. 23, the read operation is started in step S111.

In step S112, the memory device receives a medium sector address from the host system. Then, in step S113, the received medium sector address is converted into sector address SA and start column address CA of the flash memory. In step S114, a partial read command of the flash memory is set, and sector address SA and start column address CA are also specified. Then in step S115, data is read from the flash memory and written into the buffer memory.

When the write operation to the buffer memory is complete, an interrupt signal is sent to the host system in step S116.

In step S117, data written into the buffer memory is sent as read data to the host system. In step S118, the read operation is completed.

Figure 24:
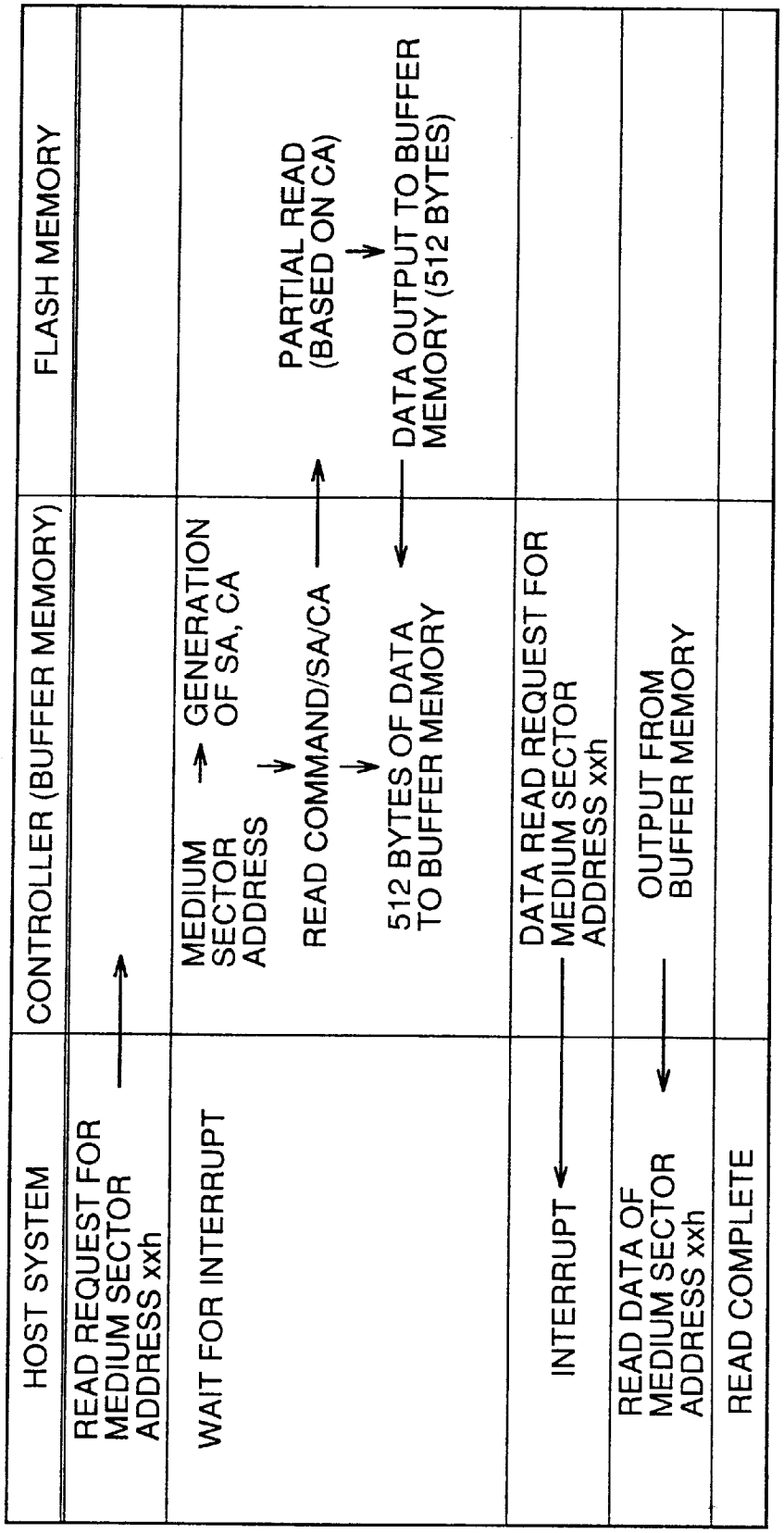
FIG. 24 is a diagram illustrating the relation between the steps of the read process shown in FIG. 23 and the respective blocks in the memory device in which the steps are performed.

FIG. 24 is a diagram illustrating the relation between the steps of the read process shown in FIG. 23 and the respective blocks in the memory device in which the steps are performed.

As seen in FIG. 24, a read request for a medium sector address is transmitted to a controller from the host system. The term "controller" refers to a portion including host interface portion 52, flash interface sequencer portion 56, and the buffer memory 54 in FIG. 15.

Consequently, sector address SA and start column address CA of the flash memory are generated from the medium sector address in the controller. Then, the controller sends a read command, sector address SA and the start column address to the flash memory. Consequently, a partial read operation is performed in the flash memory, and 512 bytes of data is output to the buffer memory. When the data write operation to the buffer memory is completed, the controller makes a read request for data from the specified medium sector address to the host system. The data is read from the buffer memory to the host system, and the read operation is completed.

Figure 25:
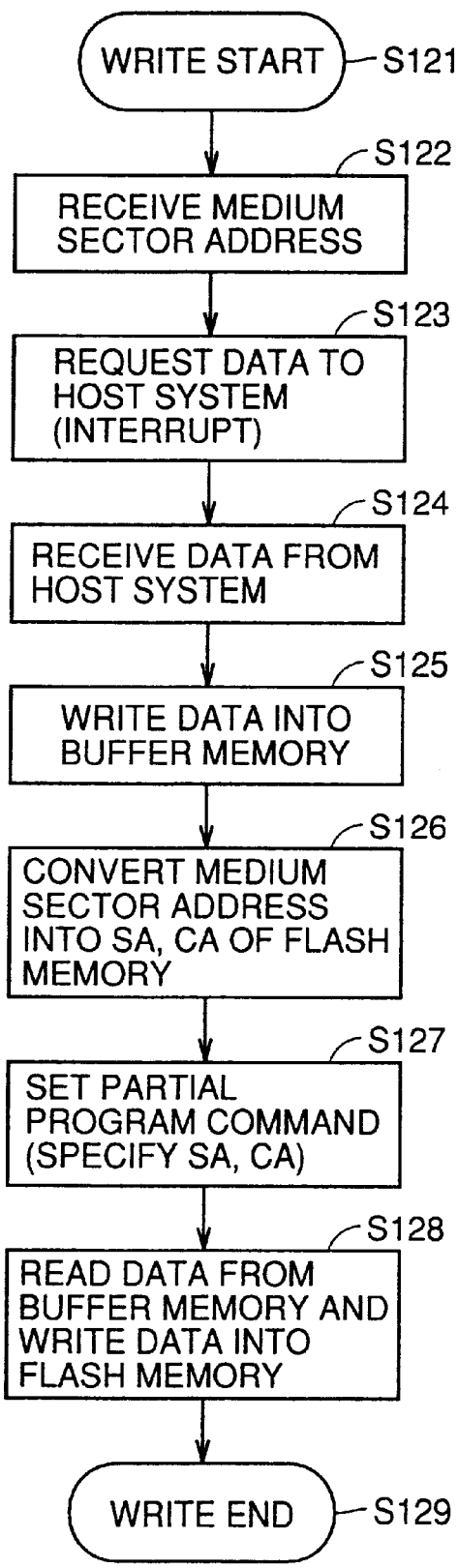
FIG. 25 is a flow chart illustrating in detail the write process in step S105 shown in FIG. 22.

FIG. 25 is a flow chart illustrating in detail the write process in step S105 shown in FIG. 22.

As seen in FIG. 25, the write operation starts in step S121.

Then, in step S122 the medium sector address transmitted from the host system is received by the memory device.

In step S123, the memory device requests the host system to send data, and receives the data from the host system in step S124. The data is written into the buffer memory in step S125.

In step S126 sector address SA and start column address CA of the flash memory are generated from the medium sector address received in step S122. Then, in step S127 a partial program command is set for the flash memory, and thereafter, sector address SA and start column address CA are specified.

In step S128 the data is read from the buffer memory and is written into the flash memory. Then the data write operation ends in step S129.

Figure 26:
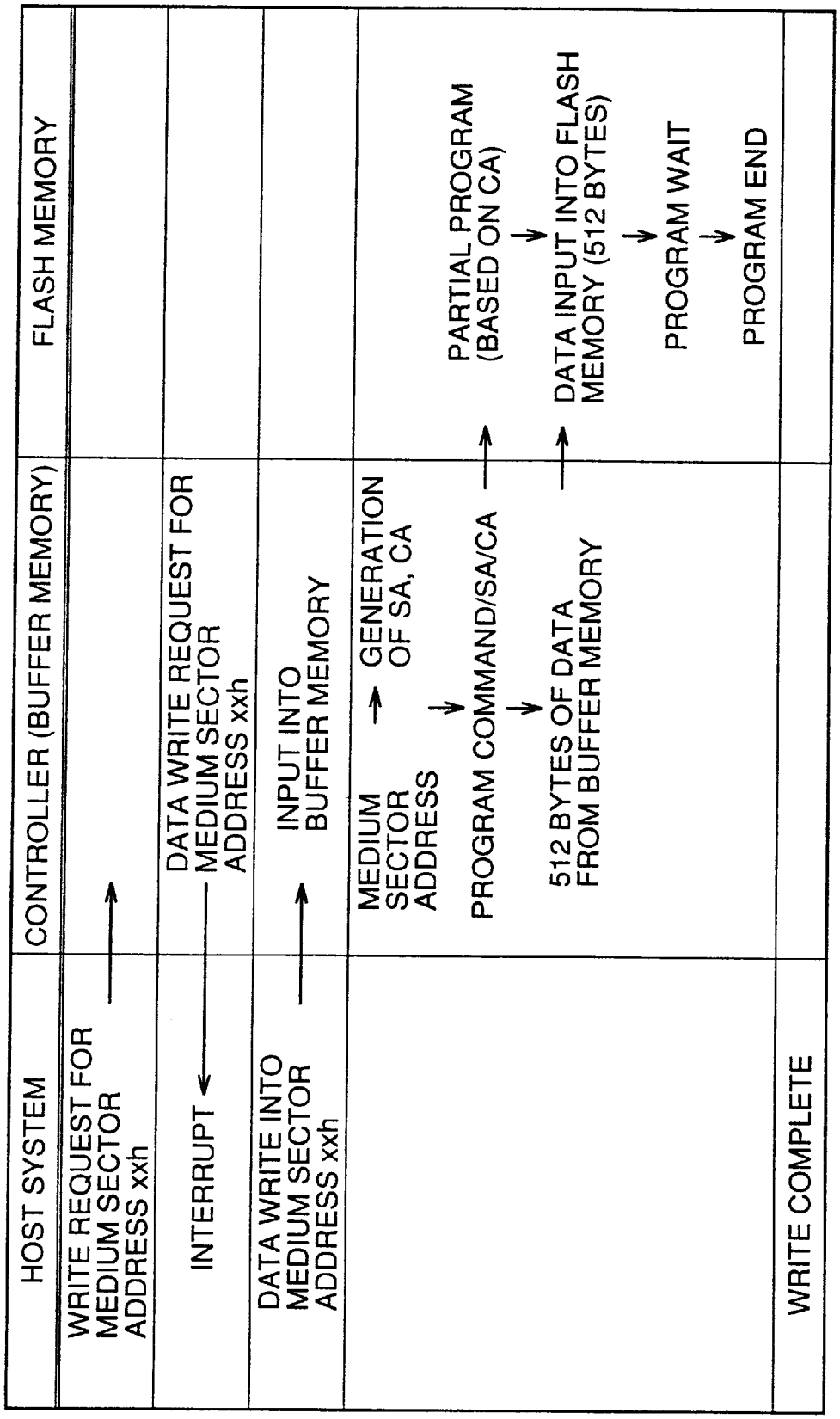
FIG. 26 is a diagram showing how each step of the write process shown in FIG. 25 is performed between a host system and a controller, and between the controller and a flash memory.

FIG. 26 is a diagram showing how each step of the write process shown in FIG. 25 is performed between the host system and the controller, and between the controller and the flash memory.

As seen in FIG. 2G, first, a write request for the medium sector address is transmitted from the host system to the controller. The controller receives this request and makes a data write request for the medium sector address to the host system. In response, the host system writes the data into the medium sector address. The data is input into the buffer memory via the controller.

In the controller, sector address SA and start column address CA of the flash memory are generated from the medium sector address which had been received. The controller sets the program command, sector address /SA and start column address /CA for the flash memory. Consequently, the flash memory performs a partial program operation. The 512 bytes of data is input from the buffer memory to the flash memory, and the data write operation is performed starting with a prescribed column address.

When 512 bytes of write data is input from the buffer memory to the flash memory, the write operation ends after a prescribed wait time.

In the second embodiment, the address control of the buffer memory and the generation of the address signal provided to the flash memory from the medium sector address take place in column address control portion 58 shown in FIG. 15.

Figure 27:
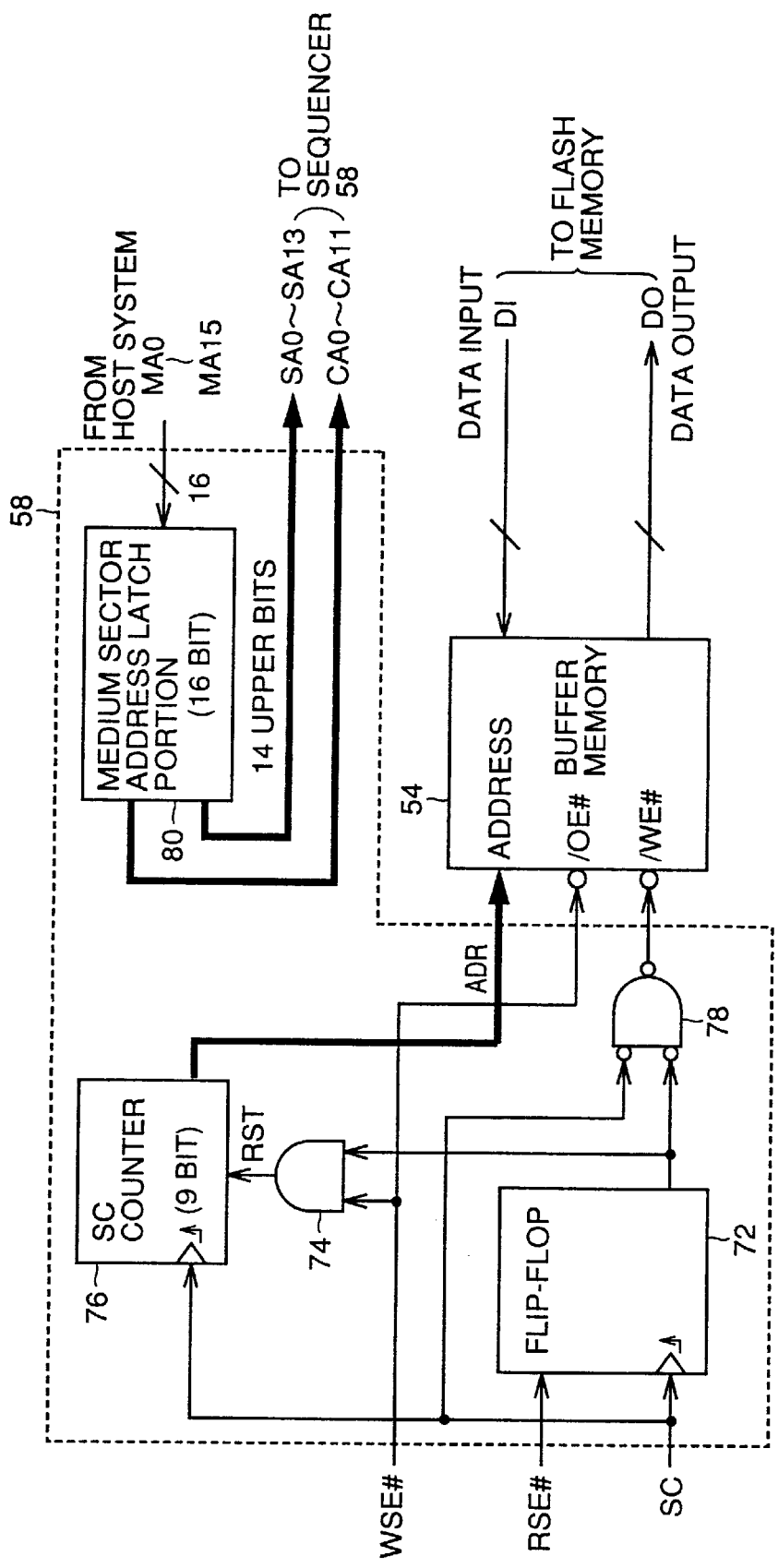
FIG. 27 is a block diagram representing in detail a column address control portion 58 shown in FIG. 15.

FIG. 27 is a block diagram representing in detail a column address control portion 58 shown in FIG. 15.

As seen in FIG. 27, column address control portion 58 includes a flip-flop 72 for latching in synchronism with the rise of a clock signal SC a read sector enable signal RSE# generated inside the memory device, an AND circuit 74 for outputting as a reset signal RST the logical sum of the output from flip-flop 72 and a write sector enable signal WSE# generated inside the memory device, a 9 bit SC counter 76 which is reset by reset signal RST and thereafter starts the count-up in response to the rise of clock signal SC, a medium sector address latch portion 80 for latching a 16 bit medium sector address from the host system and for outputting the 14 bits SA0 to SA13 of a sector address and 12 bits CA0 to CA11 of a start column address, to sequencer portion 6, and a gate circuit 78 for receiving the output from flip-flop 72 and clock signal SC to output a write enable signal /WE#.

For ease of description, buffer memory 54 is illustrated in FIG. 27. Buffer memory 54 receives the 9 bits of the count value of SC counter 76 as an address signal ADR, write sector enable signal WSE# as an output enable signal /OE#, and the output of gate circuit 78 as write enable signal /WE#, and, in response to the these signals, receives and holds data input DI from the flash memory, or sends data output DO to the flash memory.

As described above, in the second embodiment, the capacity of the buffer memory for the temporary storage of data during the data transfer between the host interface portion and the host system can be made smaller than the capacity of one sector of the flash memory so that a memory device having an advantage with respect to the cost can be provided. In addition, the provision and the use of a flash memory capable of performing the partial read/program allow the read and rewrite operations one medium sector as a unit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory device having a write mode in which data is stored upon reception of an external write address signal and an external write data train from a host system, comprising:
   (a) a flash memory in which, during data erase operation, data is erased from each unit memory region holding a prescribed number of bits of data, and in said write mode, an internal write data train having a prescribed data length is written according to an internal write address signal; and
   (b) a data input/output portion for receiving said external write address signal and generating said internal write address signal, for receiving and holding said external write data train, and for outputting said internal write data train based on said external write data train and said external write address signal in said write mode, wherein
   said data input/output portion includes
   (b-1) a first interface portion for receiving said external write data train and said external write address signal from said host system in said write mode,
   (b-2) a buffer memory having a storage capacity corresponding to data elements not smaller in number than data elements contained in said external write data train and smaller in number than data elements contained in said internal write data train, and for receiving said external write data train from said first interface portion in said write mode, and
   (b-3) a second interface portion for receiving said external write address signal from said first interface portion and generating said internal write address signal, and for generating said internal write data train by adding to said external write data train read from said buffer memory dummy data which preserve storage data from overwriting erasure in said unit memory region according to said external write address signal.

2. The memory device according to claim 1, wherein said dummy data has a value corresponding to an initial data said flash memory holds immediately after data in said flash memory is erased,
   said second interface portion successively outputs data elements of said internal write data train, and
   said internal write data train includes said external write data train as a plurality of said data elements in succession, wherein said external write data train is arranged to start from the (k+1)th data element of said internal write data train in response to the control of said external write address signal, wherein k is a non-negative integer.

3. The memory device according to claim 2, wherein k is a non-negative integer multiple of the number of data elements contained in said external write data train.

4. The memory device according to claim 3, wherein said internal write data train includes data elements of a number which is a natural number multiple of the number of data elements contained in said external write data train.

5. The memory device according to claim 2, wherein said flash memory successively takes in the data elements of said internal write data train in synchronism with a clock, said second interface portion includes a data transfer control portion for generating a read control signal for said buffer memory and receiving said external write data train from said buffer memory to generate said internal write data train, and for generating said internal write address signal from said external write address signal, said data transfer control portion having a counter which starts counting said clock when writing of said internal write data train into said flash memory starts, a comparator for outputting a match signal when an offset signal contained in said external write address signal matches a prescribed number of bits from a highest order bit of a count value of said counter, a gate circuit for providing a read control signal to said buffer memory according to said match signal so that said buffer memory outputs said external write data train in synchronism with said clock, and a selecting circuit for providing to said flash memory a value corresponding to said initial data when said match signal is deactivated, and for providing as said internal write data train to said flash memory said external write data train read from said buffer memory when said match signal is activated.

6. The memory device according to claim 1, wherein said memory device further has a read mode in which said memory device receives an external read address signal from said host system to output an external read data train to said host system, said data input/output portion, in said read mode, receives said external read address signal to generate an internal read address signal, provides said internal read address signal to said flash memory, selects and holds a portion of an internal read data train read from said flash memory as said external read data train, and thereafter, outputs said external read data train to said host system, said first interface portion receives said external read address signal and outputs said external read data train corresponding to said external read address signal to said host system in said read mode, said buffer memory has a storage capacity corresponding to data elements not smaller in number than data elements contained in said external read data train and smaller in number than data elements contained in said internal read data train, and in the read mode, outputs a held external read data train to said first interface portion, and said second interface portion, in said read mode, receives said external read address signal from said first interface portion to generate said internal read address signal, provides said internal read address signal to said flash memory so that said internal read data train is read from said flash memory and that a portion of the data elements contained in said internal read data train is received by said buffer memory as said external read data train.

7. The memory device according to claim 6, wherein said flash memory successively outputs data elements contained in said internal read data train according to said internal read address signal, and said internal read data train includes said external read data train as a plurality of said data elements in succession, wherein said external read data train is arranged to start from the (k+1)th data element of said internal read data train in response to the control of said external read address signal, wherein k is a non-negative integer.

8. The memory device according to claim 7, wherein k is a non-negative integer multiple of the number of data elements contained in said external write data train.

9. The memory device according to claim 8, wherein said internal read data train includes data elements of a number which is a natural number multiple of the number of data elements contained in said external read data train.

10. The memory device according to claim 7, wherein said flash memory successively outputs data elements to said internal read data train in synchronism with a clock, said second interface portion includes a data transfer control portion for generating said internal read address signal from said external read address signal, and for generating a write control signal to said buffer memory so that said buffer memory selects and stores a portion of said internal read data train as said external read data train, said data transfer control portion having a counter which starts counting said clock when reading of said internal read data train from said flash memory starts, a comparator for outputting a match signal when an offset signal contained in said external write address signal matches a prescribed number of bits from a highest order bit of a count value of said counter, and a gate circuit for providing said write control signal to said buffer memory according to said match signal so that said buffer memory stores a portion of data elements contained in said internal read data train as said external read data in synchronism with said clock.

11. A memory device communicating an external data train according to an external address signal from a host system, comprising:

a data input/output portion for generating an internal main address and an internal sub-address corresponding to said external address; and a flash memory in which, during data erase operation, data is erased from each unit memory region holding a prescribed number of bits of data, said each unit memory region is selected by said internal main address, a data transmission and reception start location within said unit memory region is specified by said internal sub-address, and an internal data train containing a plurality of data elements can be received and transmitted, wherein a storage capacity of said unit memory region is larger than a storage capacity corresponding to the number of data elements contained in said external data train, and said data input/output portion extracts a part of bits included in said external address and shifts said part to generate said internal sub-address.

12. The memory device according to claim 11, wherein said data input/output portion includes a buffer memory having a storage capacity corresponding to the number of data elements contained in said external data train and for temporarily holding said external data train and said internal data train to adjust timing of data communication between said host system and said flash memory.

13. The memory device according to claim 11, wherein said data input/output portion shifts said part by a prescribed number of bits which is associated with the number of data elements contained in said external data train.

\* \* \* \* \*